(12) United States Patent
Thibault et al.

(10) Patent No.: US 9,933,243 B2
(45) Date of Patent: Apr. 3, 2018

(54) SINGLE SENSOR DOOR/WINDOW STATE DETECTOR

(75) Inventors: Thomas Thibault, San Diego, CA (US); Michael Bailey, Carlsbad, CA (US); Michael Lamb, Rancho Santa Fe, CA (US); Carlo Petrucci, Carlsbad, CA (US); George Seelman, Temecula, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 687 days.

(21) Appl. No.: 13/604,479

(22) Filed: Sep. 5, 2012

(65) Prior Publication Data

US 2014/0062466 A1 Mar. 6, 2014

(51) Int. Cl.
*G01B 7/14* (2006.01)
*E05B 45/06* (2006.01)
*G08B 13/08* (2006.01)

(52) U.S. Cl.
CPC ..................................... *G01B 7/14* (2013.01)

(58) Field of Classification Search
CPC .......................................................... G01B 7/14
USPC .................................................... 324/207.22
See application file for complete search history.

(56) References Cited

U.S. PATENT DOCUMENTS

2009/0140858 A1* 6/2009 Gore et al. ..................... 340/547
2013/0257611 A1* 10/2013 Lamb et al. .................... 340/501
2014/0006823 A1* 1/2014 Lamb ............................. 713/323

* cited by examiner

*Primary Examiner* — Bot Ledynh
(74) *Attorney, Agent, or Firm* — Greenberg Traurig, LLP

(57) ABSTRACT

A security apparatus is described for determining a condition of a door or window. In one embodiment the apparatus comprises a sensor for measuring an attribute that varies as a first door or window condition is achieved and as a second door or window condition is achieved, and for generating signals indicative of the attribute, and a processor coupled to the sensor for determining the first door or window condition and the second door or window condition based on the signals from the sensor.

9 Claims, 19 Drawing Sheets

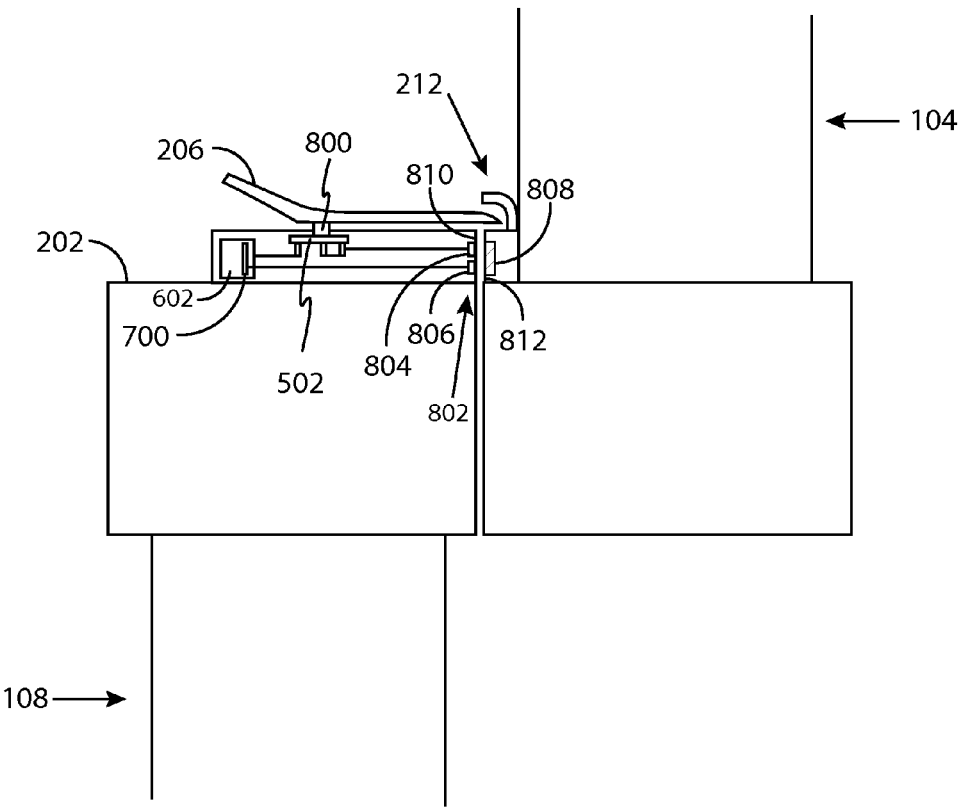
FIG. 8A
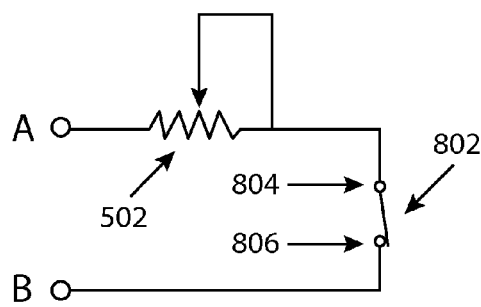 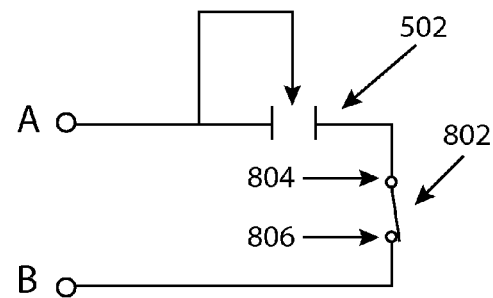
FIG. 8B       FIG. 8C

SINGLE SENSOR DOOR/WINDOW STATE DETECTOR

BACKGROUND

I. Field of Use

The present application relates to the field of home security. More specifically, the present application relates to door and window sensors typically used in homes and businesses.

II. Description of the Related Art

Security systems for homes and businesses have been around for many years. Often, these systems make use of sensors installed onto doors and windows to determine whether the doors or windows are in an open or closed state using a magnet and a reed switch in combination with each other. The magnet is typically installed onto a movable part of a window or onto a door, while the detector is mounted to a stationary surface, such as a door or window frame. When the door or window is closed, the magnet and reed switch are in close proximity to one another, maintaining the reed switch in a first state indicative of a "no alarm", or "closed", condition. If the door or window is opened, proximity is lost between the magnet and the reed switch, resulting in the reed switch changing state, e.g., from closed to open or from open to closed. The change of state is indicative of an alarm condition, and a signal may be generated by circuitry associated with the reed switch and sent, via wires or over-the-air, to a central processing station, either in the home or at a remote monitoring facility. Alternatively, or in addition, a loud audible alert may be generated, either at the central processing station in the home or directly by the circuitry associated with the reed switch, indicating that a door or window has been opened (or closed).

More recently, advances in technology allow door and window sensors to determine more than just the open or closed status of a door or window. For example, U.S. patent application Ser. No. 12/323,542, assigned to Andersen Corporation of Bayport, Minn., describes a window sensor apparatus that is able to determine both an open or close status of a window and a locked or unlocked status of a window lock associated with the window. The apparatus uses a first sensor to determine whether the window is closed or open, and a second sensor to determine whether a locking mechanism associated with the window is in a locked or unlocked state. Each of the sensors provides information to a processor, where it may be then transmitted to a remote monitoring device, such as a central alarm system.

One of the disadvantages of the prior art described above is that it requires two, independent sensors, thus allowing for two potential points of failure in the system.

Another disadvantage of the prior art is the cost and complexity of using two, independent sensors. While having two sensors allows the apparatus to determine two, independent statuses of the window (i.e., open/closed and locked/unlocked), the cost of such a device must reflect the use of both sensors. Additionally, the complexity of the design is increased due to the required physical placement of the second sensor in a limited area, such as in the window lock and/or window frame.

Thus, it would be desirable to provide a security sensor that eliminates the shortcomings of the prior art.

SUMMARY

A security apparatus is described for determining a condition of a door or window. In one embodiment the apparatus comprises a sensor for measuring an attribute that varies as a first door or window condition is achieved and as a second door or window condition is achieved, and for generating signals indicative of the attribute, and a processor coupled to the sensor for determining the first door or window condition and the second door or window condition based on the signals from the sensor.

In another embodiment, a method for determining a door or window state is described, comprising measuring, by a sensor, an attribute that varies as the door or window is opened or closed and as the door or window is placed in a locked or unlocked state, comparing the attribute to information stored in a memory indicative of at least one door or window state, determining, by a processor coupled to the memory and the sensor, the at least one door or window state based on the comparison of the attribute to the information in the memory, and transmitting the door or window state to a remote entity.

In another embodiment, a status monitoring device for a window or door is described, the window or door including at least one portion movable between an open position and a closed position and the window or door including at least one locking mechanism movable between a locked position and an unlocked position, the device comprising a sensor for generating a signal indicative of a measured parameter that varies as the first portion is moved between the open position and the closed position and as the locking mechanism is moved between the locked position and the unlocked position, a memory for storing predetermined information relating the measured parameter to one of a multiple of door or window statuses, and a processor coupled to the sensor and to the memory, for receiving the signal from the sensor and comparing information in the signal to the information stored in the memory, and for determining at least two conditions associated with the door or window based on the comparison.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 8a is a cut-way view of another embodiment of a security apparatus as mounted to a top of a window lower sash;

FIG. 8b is a schematic representation of one embodiment of the sensor shown in FIG. 8a, shown as a variable resistor and a switch;

FIG. 8c is a schematic representation of another embodiment of the sensor shown in FIG. 8a, shown as a variable capacitor and switch;

FIG. 11b is an exploded view of a deadbolt assembly used in conjunction with the security apparatus of FIG. 11a;

DETAILED DESCRIPTION

The present description relates to a variety of embodiments of a security apparatus, used on doors and windows, that is able to determine at least two conditions, states, or statutes, of a door or a window, one condition comprising an open/closed condition and a second condition comprising a locked/unlocked condition of a locking mechanism associated with the door or window (e.g., the locked/unlocked status of a door or window). Advantageously, the security apparatus uses only a single sensor to accomplish the detection of both open/close status and lock/unlock status, as opposed to prior art devices that require use of two sensors to determine both of the these conditions.

Figure 1:
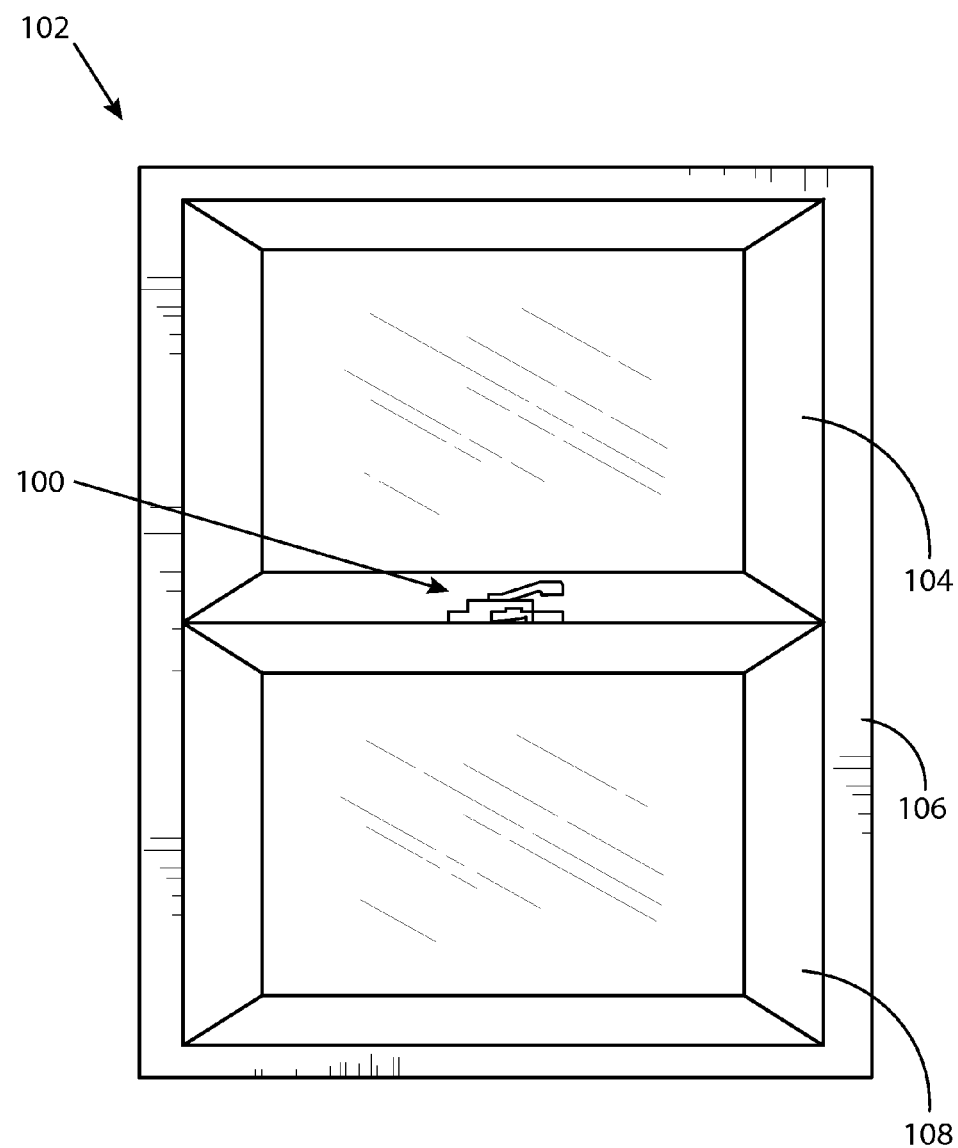
FIG. 1 illustrates a first embodiment of a security apparatus used to determine an open/close status and a lock/unlock status of a window.

FIG. 1 illustrates a first embodiment of a security apparatus 100 used to determine an open/close status and a lock/unlock status of a window 102. In this embodiment, window 102 comprises a well-known "double-hung" window having a first sash 104, typically held in a stationary position relative to window frame 106, and a second, movable sash 108, capable of moving in a vertical direction with respect to the first sash 104 and frame 106. In this embodiment, security apparatus 100 comprises a rotatable latch that engages a catch (not shown) located on first sash 104 when security apparatus 100 is in a locked position, thereby preventing movement of second sash 108. Security apparatus 100 additionally comprises, in one embodiment, at least one magnet and a magnetic field sensor for determining the open/close status of window 102 and the lock/unlock status of the window (not shown). For example, the magnetic field sensor could comprise a hall-effect sensor, a magno-resistive sensor, or other type of magnetic field sensor. Security apparatus 100 may additionally comprise electronic circuitry to transmit wireless information pertaining to the statuses determined by security apparatus 100 and/or to receive information and/or commands from a remote entity, such as a central alarm system, wireless communication device, etc. In this way, security apparatus 100 may be integrated into a home security system having a central control panel and multiple security apparatuses, each monitoring a particular door or window throughout a home or business.

Figure 2:
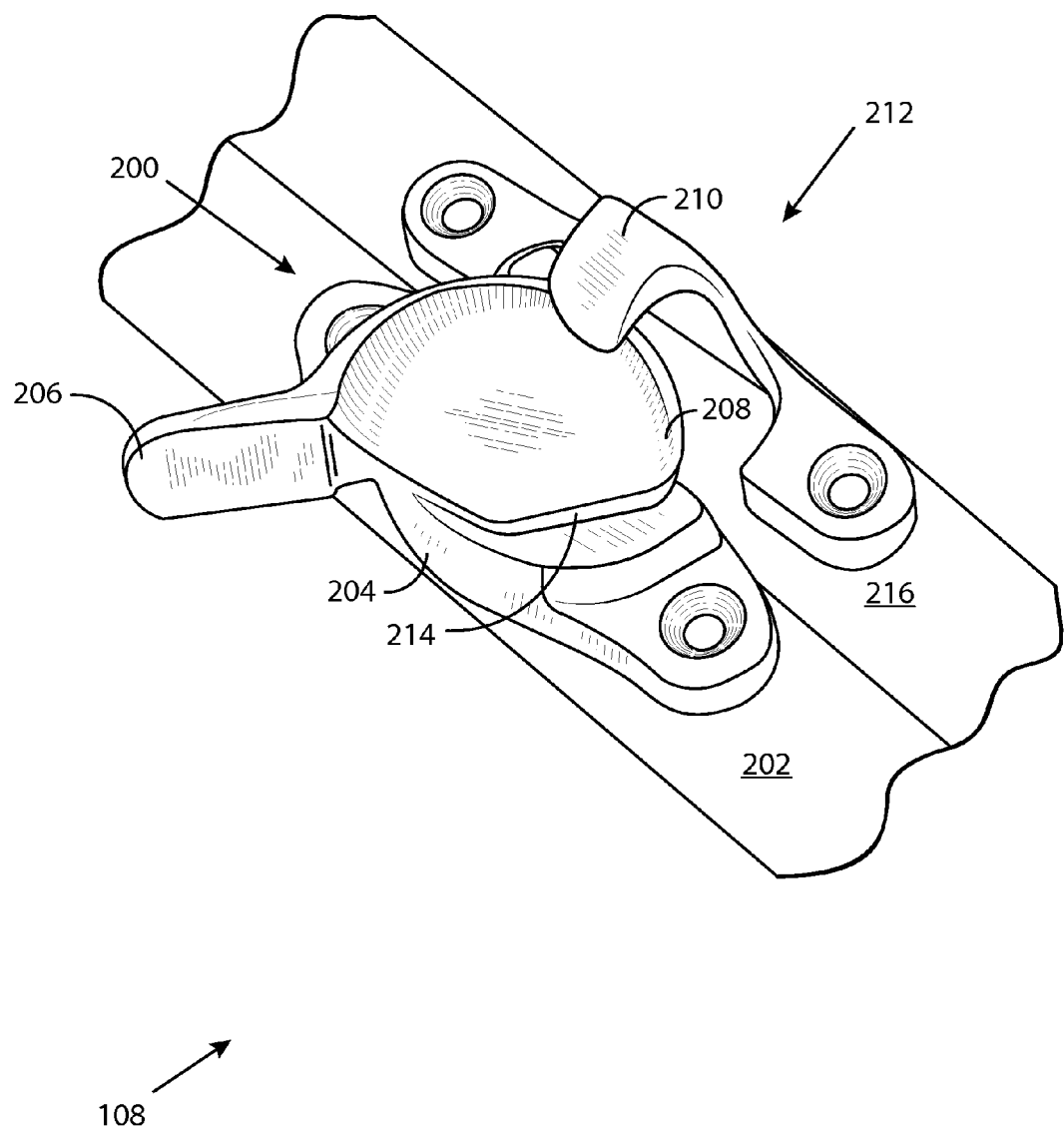
FIG. 2 is a close-up perspective view of one embodiment of the security apparatus shown in FIG. 1.

FIG. 2 is a close-up perspective view of one embodiment of security apparatus 100 shown in FIG. 1. In this embodiment, security apparatus comprises a traditional latch assembly 200 mounted to top 202 of first sash 108 and a catch 212 mounted to bottom 216 of first sash 104. Latch assembly 200 comprises a housing 204 and rotatable latch 206. Housing 204 contains a sensor for determining the lock/unlock status and open/close status of window 102. Housing 204 may contain other electronic circuitry, for example, electronic circuitry to wirelessly transmit or receive information and/or electronic circuitry or components for displaying a status of the security apparatus and/or window open/close status to an individual proximate to window 102. Rotatable latch 206 is capable of rotating to a locked position (as shown), whereby an upper lip 208 of latch 206 engages lip 210 of catch 212, and to an unlocked position, whereby a flat edge 214 of latch 206 aligns with lip 210. In the unlocked position, latch assembly 200 and first sash 108 are free to slide in an upward direction, thereby placing window 102 into an open position.

Figure 3:
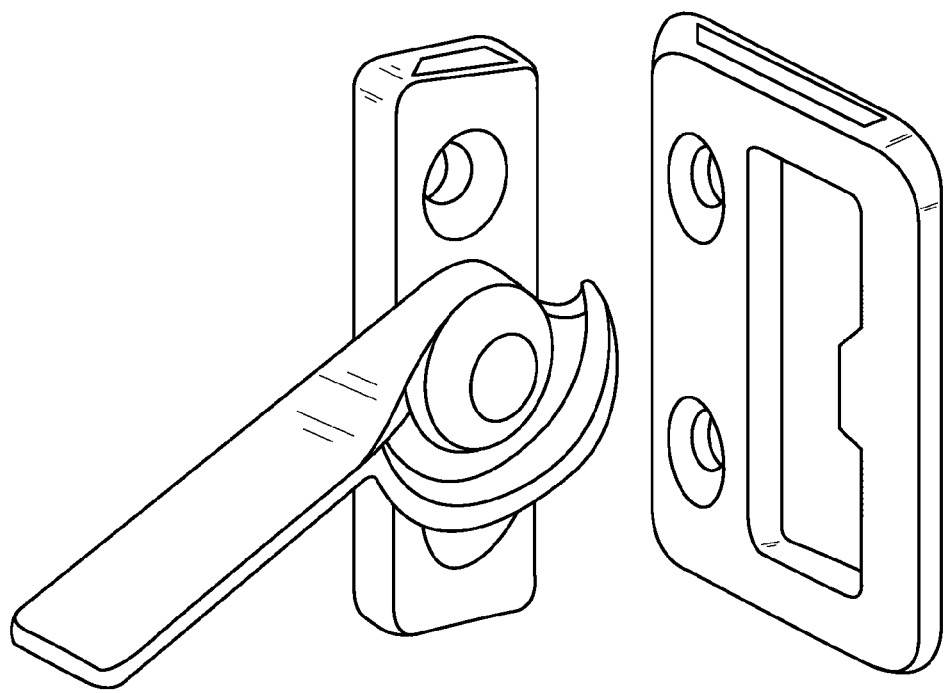
FIG. 3 is an illustration of an alternative locking mechanism from the one shown in FIG. 2.
Figure 4:
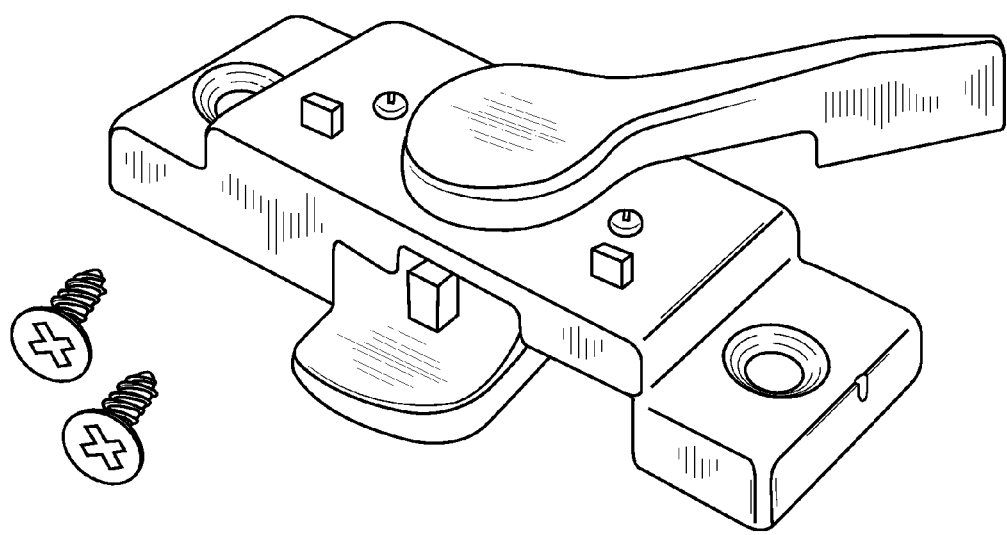
FIG. 4 is an illustration of an alternative locking mechanism from the one shown in FIG. 2.

It should be understood that the latch assembly shown in FIG. 2 is only one embodiment out of many possible embodiments of locking mechanisms available for windows. FIG. 3 and FIG. 4 illustrate two other embodiments; however their principle operation is similar to that discussed above with respect to FIG. 2: a latch operatively engages a receiving mechanism to lock the window and disengages the receiving mechanism to unlock the window.

Figure 5A:
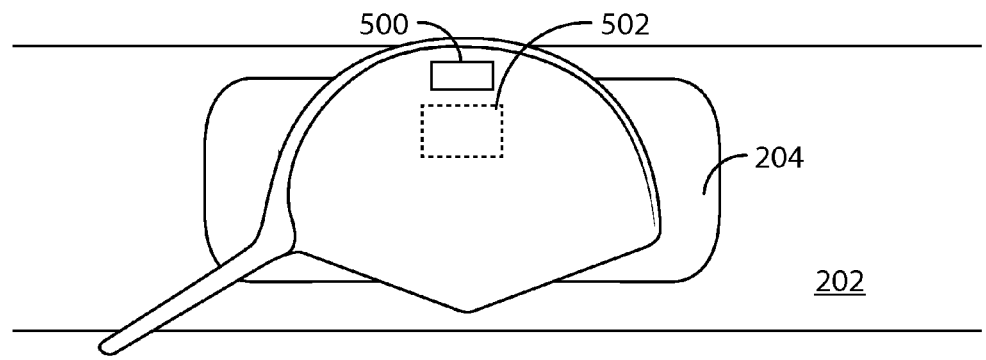
FIGS. 5a and 5b each illustrate a top view of a latch assembly, with FIG. 5a illustrating the latch assembly in a locked position and FIG. 5b illustrating the latch assembly in an unlocked position.
Figure 5B:
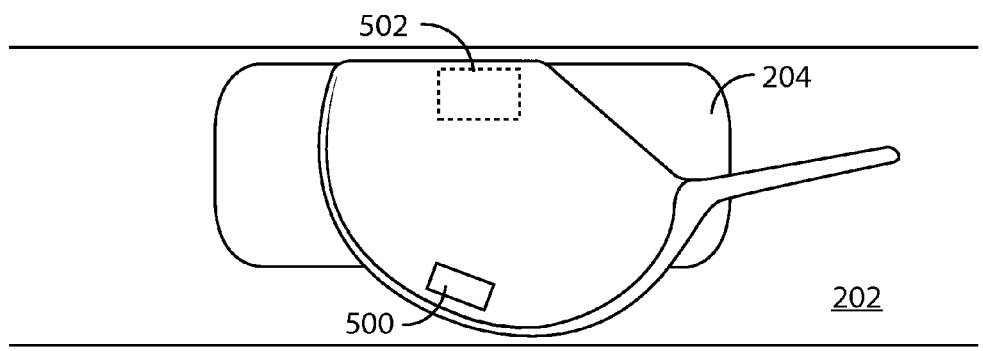

FIGS. 5a and 5b each illustrate a top view of latch assembly 200, with FIG. 5a illustrating latch assembly 200 in a locked position and FIG. 5b illustrating latch assembly 200 in an unlocked position. In this embodiment, latch 206 comprises a magnet 500 located on a portion of latch 200, as shown. In another embodiment, magnet 500 is manufactured into latch 206, typically by placing it inside a recess formed on the surface of latch 206. A magnetic field sensor 502 is located on or within housing 204 (shown in dashed lines, representing a hidden view). As shown in FIG. 5a, when latch 206 is in the locked position, magnet 500 is in close proximity to magnetic field sensor 502. As a result, a magnetic field generated by magnet 500 is sensed by magnetic field sensor 502 due to the proximate relationship between magnetic field sensor 502 and magnet 500. When latch 206 is in an unlocked position, as shown in FIG. 5b, magnet 500 is rotated away from magnetic field sensor 502. As a result, the magnetic field sensed by magnetic field sensor 502 is reduced with respect to the magnetic field strength sensed when latch 206 is in the locked position. Thus, magnetic field sensor 502 is capable of determining when security apparatus 100 is in a locked or unlocked state.

In another embodiment, magnet 500 is not used. In this embodiment, at least a portion of latch 206, such as an area along edge 504, is constructed of a metal that causes a magnetic field to change when latch 206 is moved from a locked to an unlocked position (or vice-versa). A magnet located on upper sash 104 on or near catch 212 interacts with the magnetic sensor 502 when window 102 is in a closed position due to the proximity between the magnet and magnetic sensor 502. An increase in magnetic field is detected by magnetic sensor 502 and, thus, it can be determined when window 102 is in a closed or open position. When window 102 is in the closed and unlocked position, the magnetic sensor 502 senses a magnetic field due to the proximity of the magnet on upper sash 104. As latch 206 is rotated to engage lip 210 of catch 212, the metallic portion of latch 206 becomes proximate to the magnetic sensor 502, thus interfering with the magnetic field sensed by magnetic sensor 502. The magnetic field may be increased or decreased, or otherwise changed, when latch 206 is in a locked position, depending on variables such as spatial relationships between the magnet, metallic portion, and magnetic sensor 502, as well as the density of the metallic portion, etc. Thus, it may be determined that window 102 is in a closed and locked position when the magnetic field sensed by magnetic field sensor 502 indicates a change from the magnetic field sensed when window 102 is in a closed, but unlocked, state.

In another embodiment, magnetic field sensor 502 is replaced by an electronic circuit that is responsive to a change in density. For example, the electronic circuit could comprise an RF tank circuit and magnet 500 could be replaced by any material having a relatively large density (or mass), such as lead, iron, ferrite, etc. The RF tank circuit will resonate at a first frequency when latch 206 is in a locked state as the dense material comes in close proximity to the RF tank circuit, and will resonate at a second frequency when latch 206 is in an unlocked state as the dense material moves away from the RF tank circuit. In another embodiment, latch 206 is manufactured from two or more materials, at least one of them having a density different than the other materials such that movement of latch 206 may be detected as the more-dense material is moved toward/away from the RF circuit.

In another embodiment, magnetic field sensor 502 is replaced by a capacitance sensor that detects changes in capacitance as window 102 is opened and closed, and as latch 206 is rotated between locked and unlocked positions. As just described, in this embodiment, latch 206 is constructed having a dense portion that changes the capacitance sensed by the capacitive sensor. As latch 206 is moved between a locked and unlocked position, the dense material moves toward/away from the capacitance sensor, thus allowing the capacitive sensor to determine when security apparatus 100 is in a locked or unlocked state.

Figure 6:
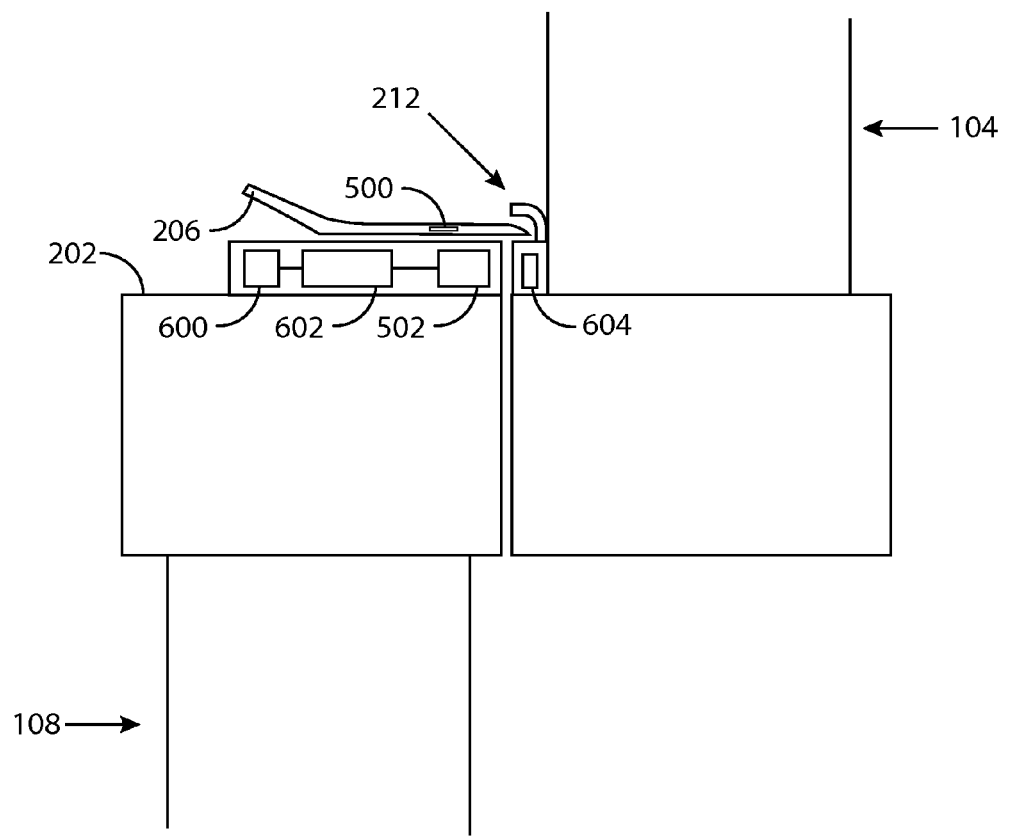
FIG. 6 is a cutaway side-view of a window and one embodiment of a security apparatus.

FIG. 6 is a cutaway side-view of window 102 and security apparatus 100. In this figure, the window 102 is in a closed position, with top 202 of lower sash 108 substantially aligned with bottom 216 of upper sash 104. Latch 206 is shown engaged with catch 212, thereby placing window 102 in a closed and locked state. Also shown are battery 600, circuitry 602, magnet 500 and sensor 502. Magnet 500 is shown embedded into latch 206 and in close proximity to sensor 502. In this position, sensor 502 senses a magnetic field produced by magnet 500 and in response, generates an electronic signal that is provided to circuitry 602. Circuitry 602 receives the signal generated by sensor 502 and may perform one or more acts in response thereto. For example, circuitry 602 may comprise a processor and a transceiver for transmitting a message to a remote entity, such as a central security control panel, indicating the lock/unlock status of window 102 based on the information provided by sensor 502. Battery 600 comprises one or more batteries suitable for powering electronic circuitry 602 and sensor 502, and is well-known in the art.

In addition to being able to determine the lock/unlock status of window 102, sensor 502 is additionally able to determine whether window 102 is in an open or closed state by sensing a second magnetic field produced by magnet 604. As shown in FIG. 6, magnet 604 is incorporated within catch 212 and is proximate to sensor 502 when window 102 is in a closed position (in other embodiments, magnet 604 is incorporated into, or placed on, an area of upper sash 104 that is proximate to sensor 502 when window 102 is in a closed position). Sensor 502 may differentiate the magnetic fields produced by magnet 500 and magnet 604 by the size of each magnet, the strength of each magnet, and/or position of each magnet relative to sensor 502 when either sensor is in close proximity of sensor 502. For example, in one embodiment, magnet 500 and magnet 604 are the same size as each other, but magnet 604 comprises a magnet that produces a denser magnetic field than magnet 500. In another embodiment, magnet 604 is larger in size than magnet 500. In yet another embodiment, magnet 604 is further away from sensor 502 when window 102 is in a closed position than the distance between magnet 500 and sensor 502 when latch 206 is in a locked position. In any of these embodiments, sensor 502 will sense a greater magnetic field from one magnet than the other, giving sensor 502 the ability to determine whether window 102 is either open or closed, and/or whether window 102 is locked or unlocked.

The magnetic fields produced by the magnets 500 and 604 may combine to form a resultant magnetic field, e.g., a magnetic field based on the addition or subjection of the magnetic fields produced by each of the magnets. The resultant magnetic field may then be used to determine at least one of four possible door or window states or statuses, comprising "open/locked", "open/unlocked", "closed/locked", and "closed/unlocked". For example, take the case where magnet 604 is five times stronger than magnet 500, i.e., the density of the magnetic field produced by magnet 604 is five times stronger than the density of the magnetic field produced by magnet 500. When window 102 is placed in the "open/locked" position, magnet 500 is in close proximity to sensor 502, while magnet 604 is not. Thus, sensor 502 will sense only the magnetic field produced by magnet 500, for example, 1 mTesla. Sensor 502 generates a signal indicative of this magnetic field and provides it to electronic circuitry 602 for processing. When window 102 is placed in the "open/unlocked" position, neither magnet 500 nor magnet 604 is in close proximity to sensor 502. Thus, sensor 502 will not sense any magnetic field (or only a very small one).

Sensor 502 generates a signal indicative of the low-or-no magnetic field and provides it to electronic circuitry 602 for processing. When window 102 is placed in the "closed/locked" position, both magnet 500 and magnet 604 are in close proximity to sensor 502. Thus, sensor 502 will sense the magnetic fields produced by both magnets, and their magnetic fields will typically add. For example, when magnet 604 is in close proximity to sensor 502, sensor 502 detects a magnetic field five times that of magnet 500, or 5 mTesla. When both magnets are in close proximity to sensor 502, sensor 502 determines a magnetic field of 6 mTesla in this example. Sensor 502 generates a signal indicative of this magnetic field and provides it to electronic circuitry 602 for processing. When window 102 is placed in the "closed/unlocked" position, magnet 500 is not in close proximity to sensor 502, while magnet 604 is. Thus, the resulting magnetic field sensed by sensor 502 will come from magnet 604, or 5 mTesla in this example. Sensor 502 generates a signal indicative of the sensed magnetic field and provides it to electronic circuitry 602 for processing. In other embodiments, the magnetic fields produced by magnets 500 and 604 will subtract from each other, based on their respective magnetic field polarities. Thus, rather than being additive when the magnets are in close proximity to sensor 502, the resultant magnetic field may be less than the magnetic field strength of one of the magnets, due to the subtractive effect of the reverse-polarity between the magnets.

In embodiments where RF or capacitive sensing is used, similar techniques are used to differentiate between whether latch 206 is in a locked or unlocked position and whether window 102 is in an open or closed state.

Figure 7:
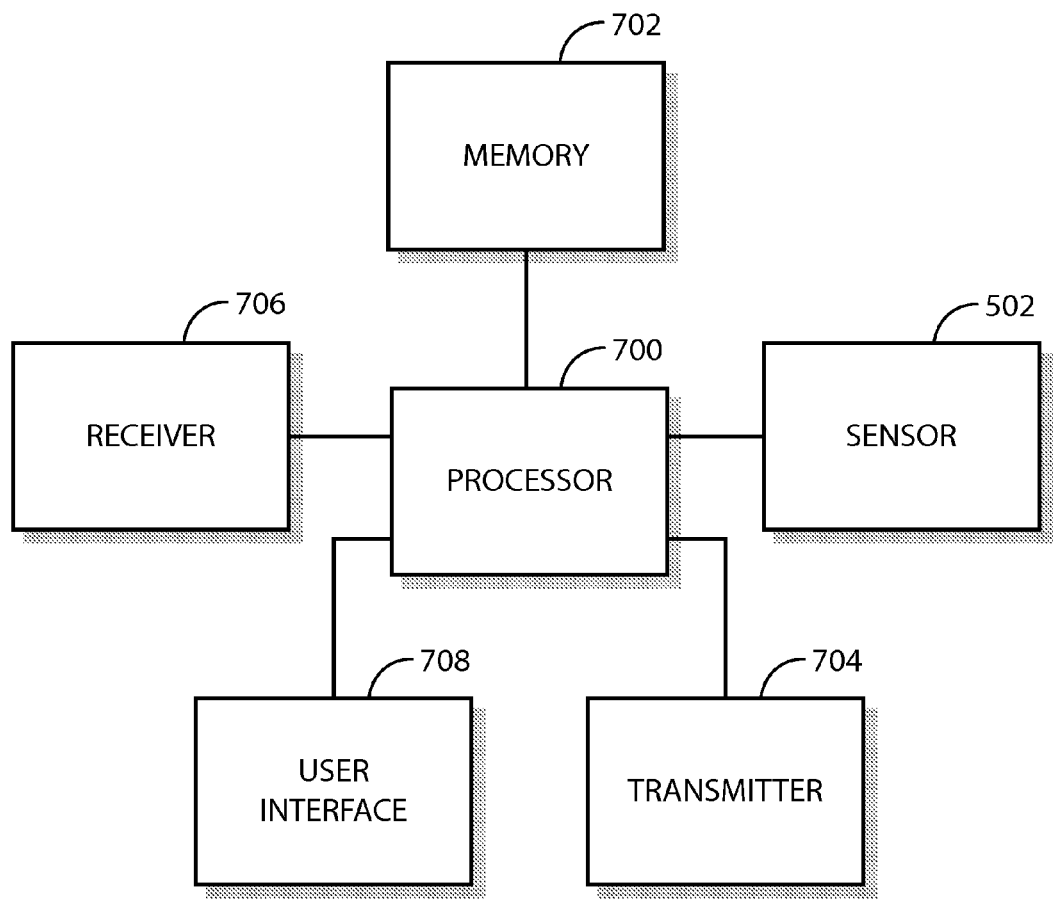
FIG. 7 is a functional block diagram of one embodiment of the security apparatus of FIG. 1 or FIG. 11a and 11b.

FIG. 7 is a functional block diagram of one embodiment of security apparatus 100. Specifically, FIG. 7 shows processor 700, memory 702, sensor 502, transmitter 704, receiver 706, and user interface 708. It should be understood that not all of the functional blocks shown in FIG. 7 are required for operation of security apparatus 100 (for example, receiver 706, user interface 708, and even transmitter 704 may not be necessary), that the functional blocks may be connected to one another in a variety of ways, and that not all functional blocks necessary for operation of security apparatus 100 are shown (such as a power supply), for purposes of clarity.

Processor 700 is configured to provide general operation of security apparatus 100 by executing processor-executable instructions stored in memory 702, for example, executable code. Processor 700 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively.

Memory 702 comprises one or more information storage devices, such as RAM, ROM, EEPROM, flash memory, or virtually any other type of electronic, optical, or mechanical memory device. Memory 702 is used to store the processor-executable instructions for operation of security apparatus 100 as well as any information used by processor 700, such as threshold information, parameter information, identification information, status information, door or window position set points, lock/unlock status, open/close status, a history of open/close and lock/unlock events and a time associated with each event, etc.

Optional user interface 708 is coupled to processor 700 and is used to allow an individual to control operation of security apparatus 100 and/or to receive information from security apparatus 100. User interface 708 may comprise one or more pushbuttons, switches, sensors, keypads, and/or microphones that generate electronic signals for use by processor 700 upon initiation by a user. User interface 708 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. Of course, the aforementioned items could be used alone or in combination with each other and other devices may be alternatively, or additionally, used.

Transmitter 704 comprises circuitry necessary to transmit signals from security apparatus 100 to remote destinations, such as a home or office central security unit, or a location remote from the structure where security apparatus 100 is installed. Such circuitry is well known in the art and may comprise BlueTooth, Wi-Fi, Zibee, X-10, Z-wave, RF, optical, or ultrasonic circuitry, among others. Alternatively, or in addition, transmitter 704 comprises well-known circuitry to provide signals to a remote destination via wiring, such as telephone wiring, twisted pair, two-conductor pair, CAT wiring, or other type of wiring.

Receiver 706 comprises circuitry necessary to receive modulated information sent via wired or wireless technology by a remote entity, such as a home or office central security unit or a location remote from the structure where security apparatus 100 is installed. Such circuitry is well known in the art and may comprise BlueTooth, Wi-Fi, RF, optical, ultrasonic circuitry, Zigbee, Z-wave, or X-10, among others. Alternatively, or in addition, receiver 706 comprises well-known circuitry to receive signals via wiring, such as telephone wiring, twisted pair, two-conductor pair, CAT wiring, or other type of wiring. Receiver 706 may be used to receive messages from a remote location, such as a central alarm monitoring panel. The messages may instruct security apparatus 100 to perform one or more actions, such as determine a new open/close status of a window or door and/or determine a new lock/unlock status of lock associated with the door or window. The message(s) may also instruct processor 700 to provide one or more past statuses from memory 702 to the remote location, by retrieving the past information from memory 702 and transmitting it to the remote location via transmitter 704. The message(s) may also be related to a registration process, whereby security apparatus 100 is added to an existing security network, typically controlled by a central alarm panel located within a structure where security apparatus 100 is installed.

Sensor 502 detects one or more physical properties, parameters, attributes, and/or characteristics to determine if a door or window is in an open or closed state, and whether a lock associated with the door or window is in a locked or unlocked state (i.e., whether a door or window is locked or unlocked). In one embodiment, sensor 502 comprises a magnetic field sensor, such as an AA0004-02E magnetic field sensor manufactured by NVE Corporation of Eden Prairie, Minn. In other embodiments, sensor 502 comprises one of a potentiometer, a capacitance sensor, an acoustic sensor, a light sensor, or an electro-mechanical assembly, which are described in greater detail later herein.

In operation, sensor 502 provides signals representative of a physical property, parameter, characteristic, or attribute being sensed, such as the strength and/or polarity of a magnetic field produced by magnet 500 and magnet 604. In other embodiments, sensor 502 provides signals representative of a capacitance, inductance, resistance, light, sound, frequencies, voltages, or spatial relationships. Processor 700 receives these signals and, based on the signals, determines whether a door or window is in an open or closed position, and whether a lock associated with the door or window is in a locked or unlocked state. This is typically done by storing information representative of the different states (e.g., open and locked, open and unlocked, closed and locked, and closed and unlocked). For example, memory 702 may store a number of magnetic field strength levels, voltage levels, current levels, capacitance levels, or inductance levels representative of the one or more door/window states, e.g. open and locked, open and unlocked, closed and locked, and closed and unlocked. Processor 700 may determine the various door/window states and store them in memory 702 along with a time at which the states were determined. Alternatively, or in addition, processor 700 may cause the state information to be transmitted to a remote location via transmitter 704, such as a central monitoring station or central alarm panel within a home or business. In one embodiment, upon detection of a change in state of either the open/close status or the lock/unlock status, processor 700 may perform one or more actions, such as illuminate an LED on user interface 708, transmit a message to a remote location indicative of the state change, store the new state information in memory 702, with or without a timestamp, etc.

FIG. 8*a* is a side, cut-way view of another embodiment of a security apparatus 100 as mounted to top 202 of a window 102 lower sash 108. In this embodiment, sensor 502 comprises a variable component, such as a potentiometer, variable capacitor, or variable inductor. Latch 206 is connected to a shaft 800 of the potentiometer, variable capacitor, or variable inductor such that as latch 206 is rotated, the shaft 800 rotates, causing the resistance, capacitance, or inductance of the variable component to vary. One terminal of sensor 502 is connected to processor 700 located on circuit board 602, while two other terminals of sensor 502 are connected together to enable processor 700 to read a variable resistance/capacitance from sensor 502 as is well-known in the art. Switch 802 comprises contacts 804 and 806 that are exposed on housing face 810 and conductor 808 that is exposed on a face 812 of catch 212. The two resistor, capacitor, or inductor terminals are electrically connected together to contact 804, while the second contact 806 is typically connected to ground on circuit board 602. When window lower sash 108 is in a closed position, as shown in FIG. 8*a*, conductor 808 is in contact with both contacts 804 and 806, causing a short circuit between the contacts. The short circuit completes an electrical path that begins at processor 700, through sensor 502, through switch 802 and finally to ground, or return, on circuit board 602. Thus, processor 700 is able to measure a resistance, capacitance, or inductance of sensor 502 when the window is in a closed position. While the window is in the closed position, rotation of latch 206 causes the resistance, capacitance, or inductance of sensor 502 to change. Thus, processor 700 can determine if latch 206 is in a locked position or an unlocked position by measuring the resistance, capacitance, or inductance of sensor 502 and comparing that value to values stored in memory 702 representative of the various window states.

FIG. 8*b* is a schematic representation of sensor 502, shown as a variable resistor and switch 802, while FIG. 8*c* is a schematic representation of sensor 502, shown as a variable capacitor and switch 802 (an embodiment where sensor 502 comprises a variable inductor is not shown; however the electrical concepts discussed in this section can be readily applied to an inductor by those skilled in the art).

When window 102 is in a closed position as shown in FIG. 8*a*, switch 802 is placed into a closed position electronically due to conductor 808 shorting contacts 804 and 806. With switch 802 closed, a circuit is completed between points A and B, allowing a measurement of the resistance/capacitance of the variable resistor/variable capacitor by processor 700 or another circuit. The measured resistance/capacitance may vary, for example, between zero ohms (zero capacitance) to the full value of the potentiometer/capacitor, for example, 10 k ohms/10 uF. However, because shaft 800 is rotated less than 180 degrees in most circumstances by the movement of latch 206 from the locked to the unlocked position, the resistance/capacitive readings between locked and unlocked positions of latch 206 are generally much closer to one another, for example, 4.5 kohms/3 uF when latch 206 is in a locked position and 6.2 k ohms/7 uF when latch 206 is in an unlocked position. The just-described circuitry can be used by processor 700 to determine that the window is in a closed position when a resistance other than an open circuit or a capacitance other than infinite is measured between points A and B. It should be understood that the variable resistor/capacitor shown in FIGS. 8*a* and 8*b* could be replaced by more complex circuitry, such as an RC low-pass filter or high-pass filter, an encoder, or any other circuitry capable of producing change in an electrical or mechanical parameter that can be measured by processor 700 or related circuitry.

Figure 9A:
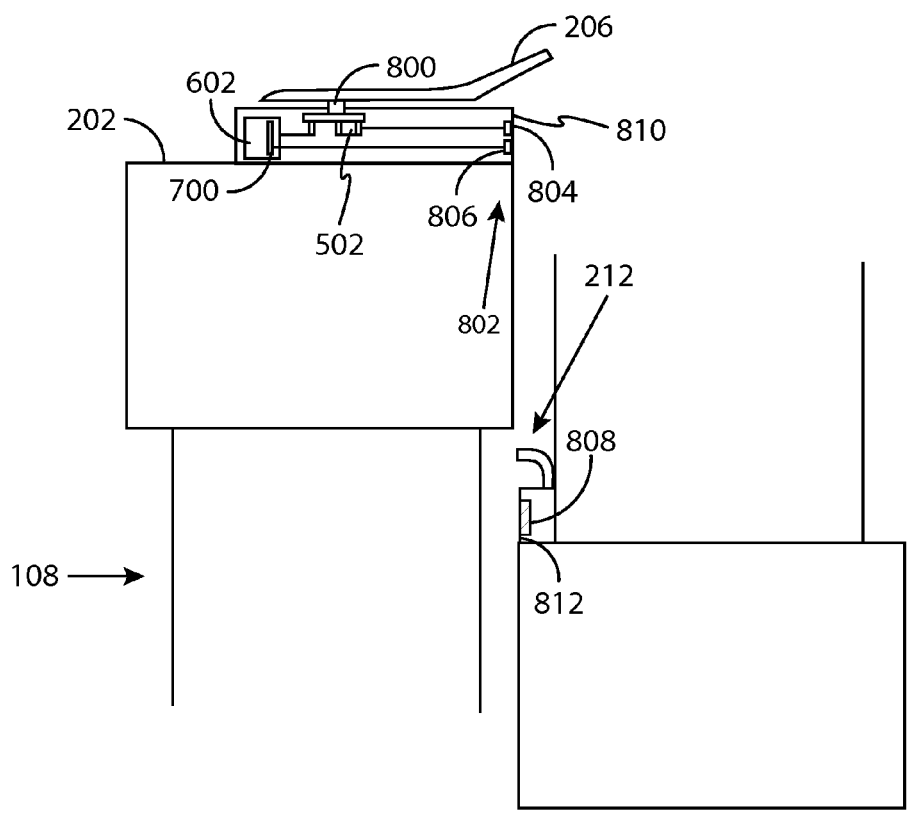
FIG. 9a is a cut-away view of the security apparatus of FIG. 8a, with the window placed into an open position and the latch placed into an unlocked position.

In a related embodiment, switch 802 may be replaced by a reed switch and conductor 808 may be replaced by a magnet. In this embodiment, when upper sash 104 and lower sash 108 are in the position indicated by FIG. 8*a* (i.e., window 102 in a closed position), the reed switch closes due to the proximity of the magnet to the reed switch. In the closed position, processor 700 is able to read a resistance/capacitance due to the circuit that is completed via the closed reed switch. When window 102 is placed into an open position, as shown in FIG. 9*a*, the reed switch opens, due to the magnet being moved away from the reed switch. This opens the circuit shown, preventing a resistance/capacitance reading by processor 700. In the open circuit state, processor can determine that window 102 is in an open state because it cannot read a valid resistance/capacitance value.

It should be understood that in some embodiments, security apparatus 100 may not be able to differentiate between the "open and locked" state and the "open and unlocked" state. Thus, only three window/door states are defined: open, closed and locked, and closed and unlocked. For example, in the embodiment shown in FIG. 8*a*, when window 102 is in an open position, processor 700 is no longer able to measure a resistance or capacitance of determine the position of latch 206, due to the open circuit caused by switch 802 being open.

FIG. 9*a* is a side, cut-away view of the security apparatus of FIG. 8*a*, with window 102 placed into an open position and latch 206 placed into an unlocked position. When window lower sash 108 is in an open position, as shown, conductor 808 is not in contact with contacts 804 and 806, causing an open circuit between the contacts. Processor 700 is unable to measure a resistance, capacitance, or inductance of sensor 502 due to the open circuit condition caused by the open circuit of switch 802. Thus, processor 700 can determine if the window is in an open position by determining that the resistance measured between points A and B has become extremely large, or infinite, or whether the capacitance or inductance measured between points A and B has become very small.

Figure 9B:
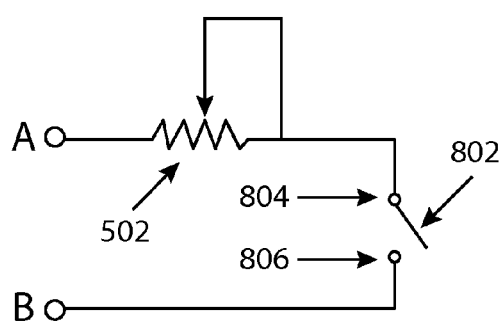
FIG. 9b is a schematic representation of one embodiment of the sensor shown in FIG. 9a, shown as a variable resistor and a switch.
Figure 9C:
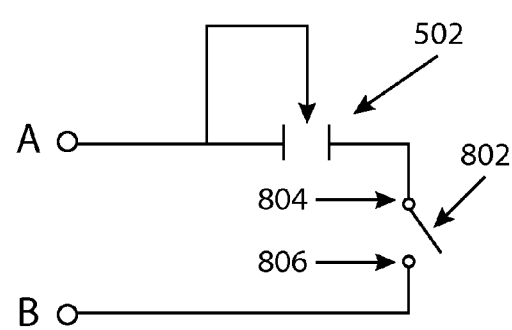
FIG. 9c is a schematic representation of another embodiment of the sensor shown in FIG. 9a, shown as a variable capacitor and a switch.

FIG. 9b is a schematic representation of sensor 502, shown as a variable resistor and switch 802, while FIG. 9c is a schematic representation of sensor 502, shown as a variable capacitor and switch 802. When window 102 is in an open position as shown in FIG. 9a, switch 802 is placed into an open position electronically due to contacts 804 and 806 being moved away from conductor 808. With switch 802 open, an open circuit results, thus preventing a resistive, capacitive, or inductive measurement by processor 700 or other circuit. Thus, processor 700 can determine that window 102 is in an open position.

Figure 10A:
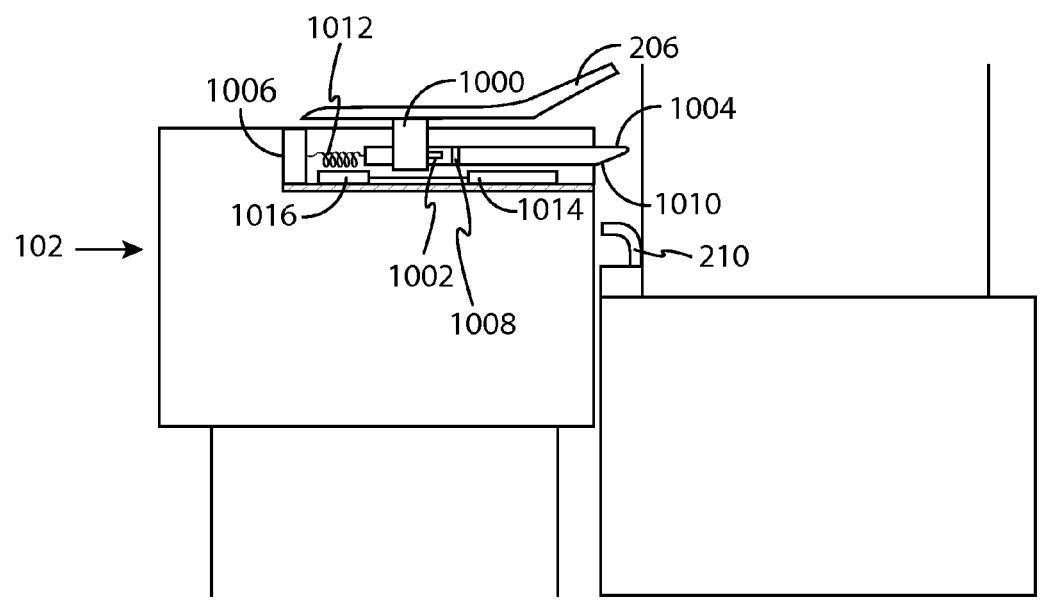
FIG. 10a illustrates a cut-way view of another embodiment of a security apparatus in an open state.

FIG. 10a illustrates a side, cut-way view of another embodiment of a security apparatus 100 as mounted to top 202 of a window 102 lower sash 108. In this embodiment, sensor 502 comprises a position sensor. It should be understood that the components shown in FIG. 10a could be re-arranged in alternative embodiments, or that fewer or a greater number of components may be used to achieve the same functionality as described below.

In this embodiment, latch 206 is connected to a shaft 1000 that interacts with deadlatch 1004 as latch 206 is rotated between a locked position and an unlocked position. The mechanical interaction causes deadlatch 1004 to move in a direction towards wall 1006 as latch 206 is rotated in one direction, and away from wall 1006 as latch 206 is rotated in an opposite direction. The mechanical interaction between shaft 1000 and deadlatch 1004 may comprise a protrusion from shaft 1000, such as tab 1002, as shown, with a mechanical protrusion or recession 1008 located on deadlatch 1004. The mechanic interaction, in other embodiments, could comprise teeth located around shaft 1000 and along deadlatch 1004, or any other mechanical arrangement where rotation of shaft 1000 causes deadlatch 1004 to move in a direction either towards or away from wall 1006, depending on whether latch 206 is being rotated clockwise or counter-clockwise.

Figure 10B:
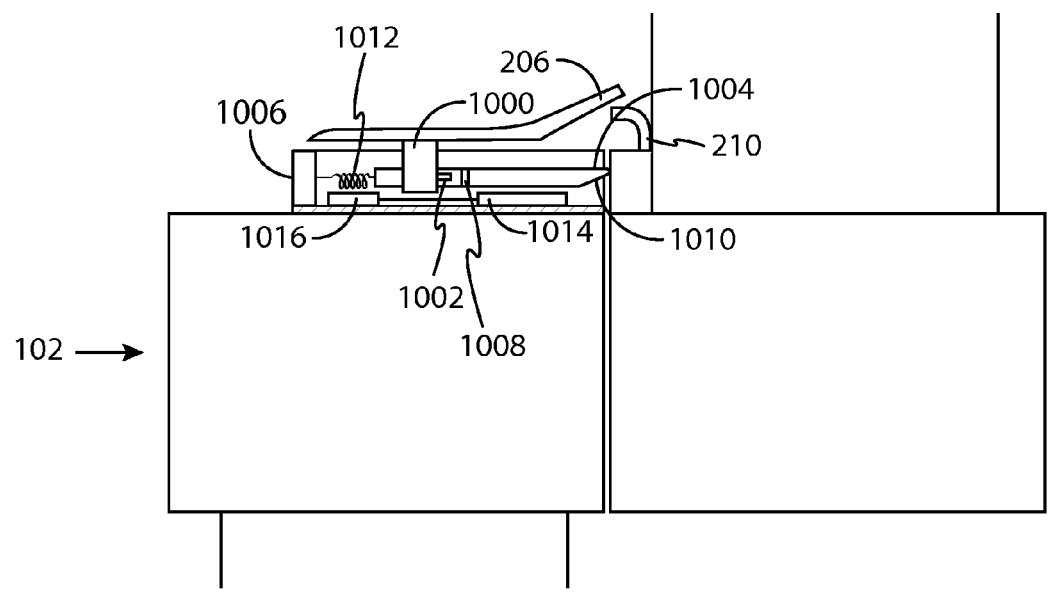
FIG. 10b illustrates a cut-way view of the security apparatus of FIG. 10a in a closed and unlocked state.

Deadlatch 1004 is also moved towards or away from wall 1006 as lower window sash 102 is moved from an open position to a closed position, shown in FIG. 10b as in the closed position. As lower window 102 is placed into the closed position, a sloped portion 1010 of deadlatch 1004 comes in contact with bottom sash 216 of upper window sash 104, pushing deadlatch 1004 towards wall 1006. When lower window 102 is moved into an open position, deadlatch 1004 is no longer in contact with upper window sash 104, and is pushed away from wall 1004 via spring 1012. Thus, the rotation of latch 206 causes deadlatch 1004 to move towards or away from wall 1006 and the opening or closing of lower window sash 102 also causes deadlatch 1004 to move relative to wall 1006.

Position sensor 1014 is used to detect the position of deadlatch 1004 and may comprise any known technology to do so. For example, position sensor 1014 could comprise one or more electrical contacts that are shorted together as a metallic area of deadlatch 1004 comes in contact with the electrical contacts. Processor 1016 receives information from the sensors to determine the deadlatch position. From the position, processor 1016 can determine if the window if in the open position and presumed in an unlocked state (i.e., deadlatch 1004 in a position furthest from wall 1006), if the window is closed and in an unlocked state (i.e., deadlatch 1004 moved one position closer to wall 1006), or if the window is in a closed and locked state (i.e., deadlatch 1004 in a position closest to wall 1006). Typically, processor 700 will compare the position of deadlatch 1004 to information stored in memory 702 to determine the current window state.

Figure 10C:
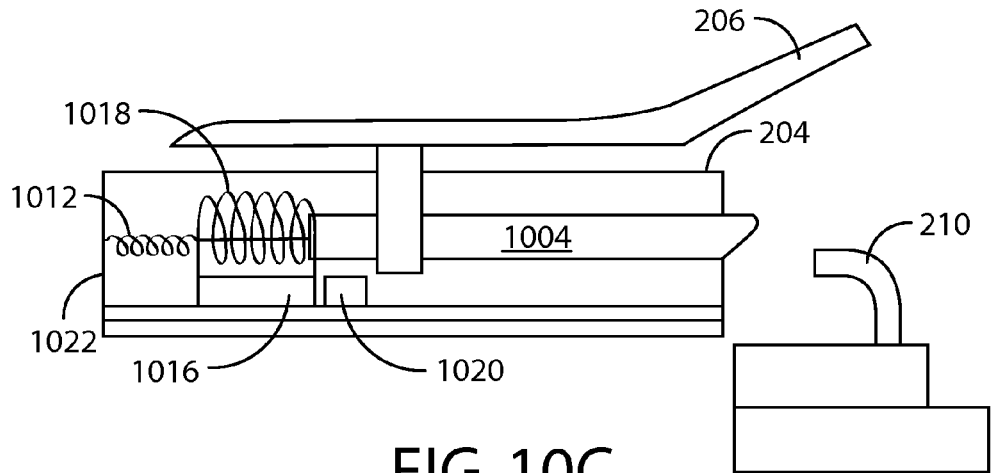
FIG. 10c illustrates a cut-away, side-view of another embodiment of a security device comprising a variable coil/inductor, showing a window in an open state.

Position sensor 1014 could comprise other means to determine the position of deadlatch 1004, such as an infrared sensor, mechanical position determination means such as rotatable knobs, potentiometers, variable capacitors, encoders, etc. It may also comprise a variable coil/inductor, as shown in FIG. 10c. In this embodiment, deadlatch 1004 is moved into an inductive coil whose inductance changes as deadlatch 1004 is moved with respect to the coil/inductor. When the window is in an open position and is unlocked, as shown, deadlatch 1004 is in a first position with respect to coil 1018. Coil 1018 comprises a wire wound in the shape of a coil, thus forming an inductor. The inductance of coil 1018 primarily depends on the wire gauge and coil diameter. However, the inductance can be altered by inserting a dense material, such as ferrous metal, into coil 1018. Thus, if deadlatch 1004 is made from such material, inserting it into coil 1018 will alter the inductance of coil 1018.

When the window is in an open position and unlocked, processor 1016 measures the inductance of coil 1018, typically by providing an alternating voltage or current to coil 1018 and measuring the resultant voltage and/or current therefrom. Other discreet components may be used to enable such a measurement, for instance, one or more capacitors, transistors, resistors, etc. and is known to those skilled in the art. Processor 1016 compares the measured inductance of coil 1018 to a predetermined inductance stored in memory 1020 to determine if the window is in the open and unlocked position.

Figure 10D:
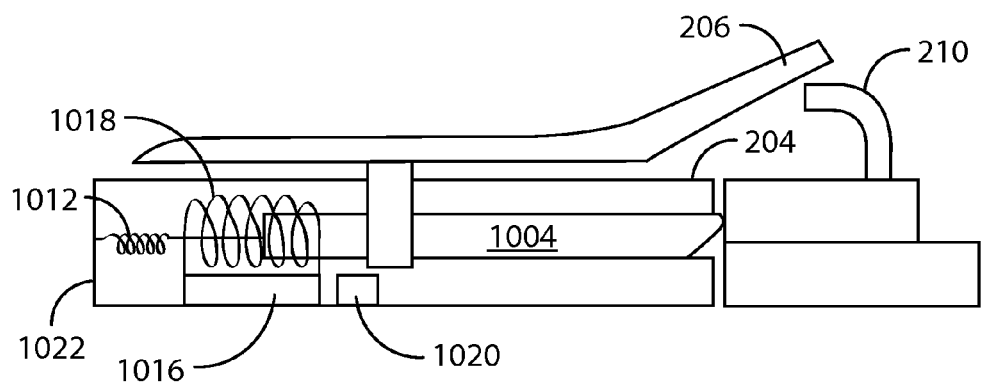
FIG. 10d illustrates a cut-away, side-view of the security device of FIG. 10c comprising a variable coil/inductor, showing a window in a closed and unlocked state.

When the window is in a closed position and unlocked, deadlatch 1004 is moved towards wall 1022 of housing 204 by virtue of sloped sash 1010 of deadlatch 1004 coming in contact with bottom portion 216 of upper window sash 104, as shown in FIG. 10d. As a result, a portion of deadlatch 1004 is inserted into a portion of coil 1018, altering the inductance of coil 1018. Processor 1016 reads the inductance of coil 1018 and compares the result to a predetermined inductance value stored in memory 1020. If the inductance of the coil matches a predetermined inductance associated with the window being closed and unlocked, the window is determined to be in a closed and unlocked position.

When the window is closed and latch 206 is placed in a locked position, deadlatch 1004 is moved further towards wall 1022 of housing 204 as latch 206 is rotated. The mechanical interaction between shaft 1000 and deadlatch 1004 causes deadlatch 1004 to move in a direction further towards wall 1022. The mechanical interaction between shaft 1000 and deadlatch 1004 may comprise a protrusion from shaft 1000, such as tab, with a mechanical protrusion or recession located on deadlatch 1004. The mechanic interaction, in other embodiments, could comprise teeth located around shaft 1000 and along deadlatch 1004, or any other mechanical arrangement where rotation of shaft 1000 causes deadlatch 1004 to move in a direction either towards or away from wall 1006, depending on whether latch 206 is being rotated clockwise or counter-clockwise.

Figure 10E:
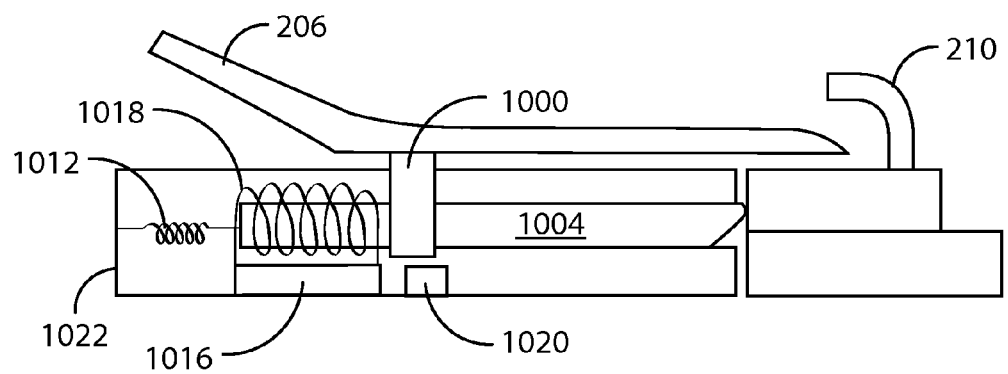
FIG. 10e illustrates a cut-away, side-view of the security device of FIG. 10c comprising a variable coil/inductor, showing a window in a closed and locked state.

When latch 206 is in a locked position, deadlatch 1004 is moved further towards wall 1022 and further into coil 1018, as shown in FIG. 10e. This further alters the inductance of coil 1018 from the previous position of deadlatch 1004 in an unlocked position. Processor 1016 reads the inductance of coil 1018 and compares the result to a predetermined inductance value stored in memory 1020. If the inductance of the coil matches a predetermined inductance associated with the window being closed and locked, the window is determined to be in a closed and locked position.

Figure 11A:
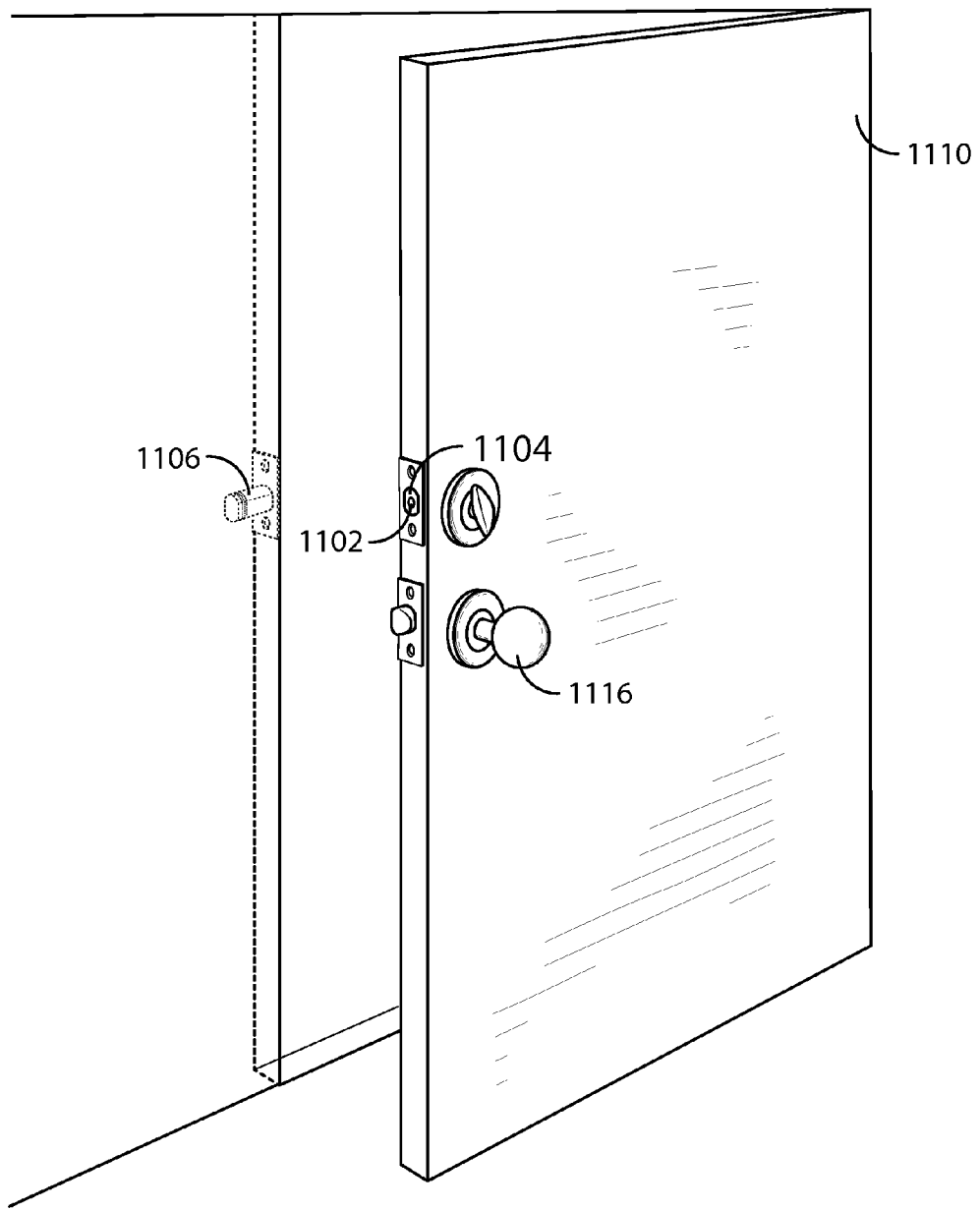
FIG. 11a is an illustration of a door and door frame using another embodiment of a security apparatus that determines an open/closed status and a locked/unlocked status of a door.
Figure 11B:
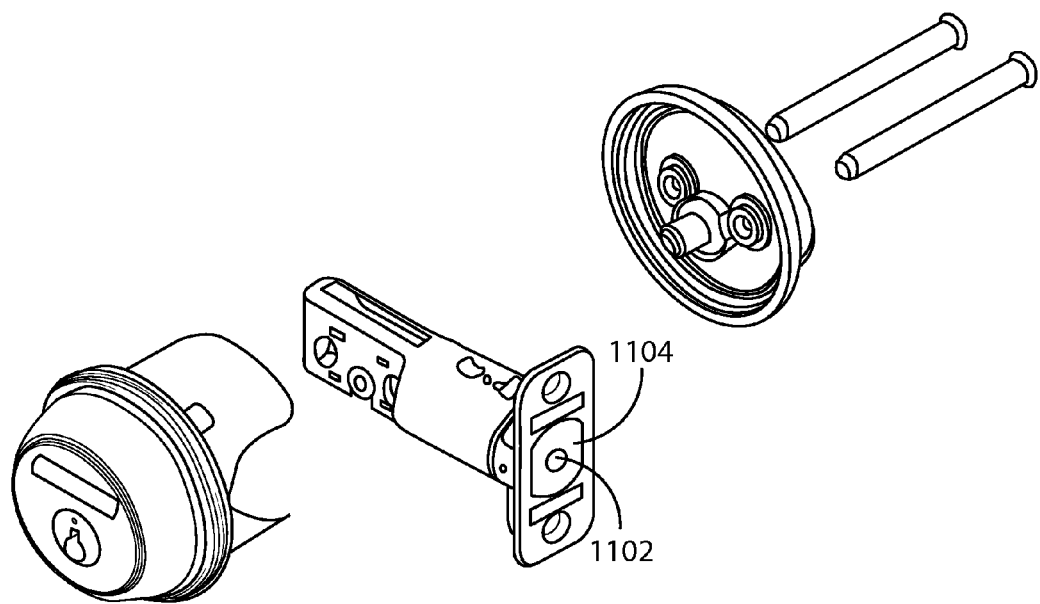

FIG. 11a is an illustration of a door and a door frame incorporating yet another embodiment of a security apparatus that determines the open/closed status and a locked/unlocked status of a door. Shown is recess 1106 in dashed lines, representing a hidden view of recess 1106, formed through the door frame and adjacent wall. In this embodiment, a magnetic field sensor is installed into recess 1106 to detect the open/close status and lock/unlock status of the door. Recess 1106 is sized and shaped to accommodate deadbolt 1104 when deadbolt 1104 is in an extended position, thereby securely locking door 1110. Sensor 1100 is installed into recession 1106, and detects magnetic fields produced by a magnet 1102 installed into a deadbolt 1104, as shown in FIGS. 11a and 11b. Although FIG. 11a shows sensor 1100 located at a rear sash of recess 1106, in other embodiments it could be located virtually anywhere within recess 1106 or even in doorframe 1208.

Figure 11C:
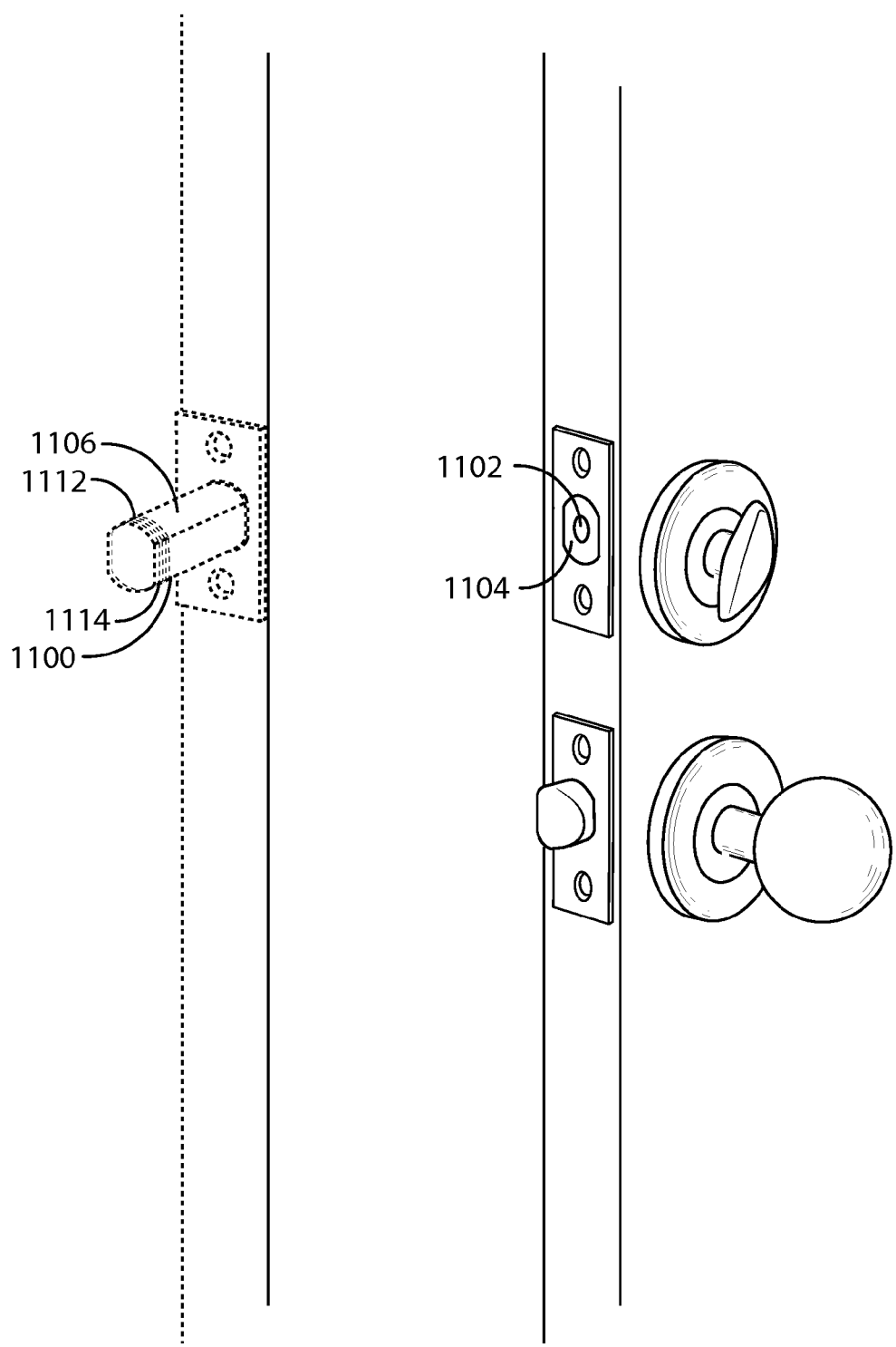
FIG. 11c is a close-up, perspective view of a door and door frame utilizing the security device of FIG. 10a, the door being in an open position.

When door 1110 is in an open position, as shown in the close-up, perspective illustration of FIG. 11c, magnet 1102 is not in close proximity to sensor 1100. Thus, the magnetic field generated by magnet 1102 is either very weak or non-existent at the location where sensor 1100 is located, inside recession 1106. Sensor 1100 is coupled to processor 1112 and provides signals to processor 1112 indicative of a magnetic field sensed by sensor 1100, for instance, the strength of a magnetic field, an orientation of a magnetic field, a change in either the strength or orientation of a magnetic field, etc. Processor 1112 receives the signals from sensor 1100 and determines that the door is in an open position when the signal from sensor 1100 indicate a low, or no, magnetic field present.

Figure 11D:
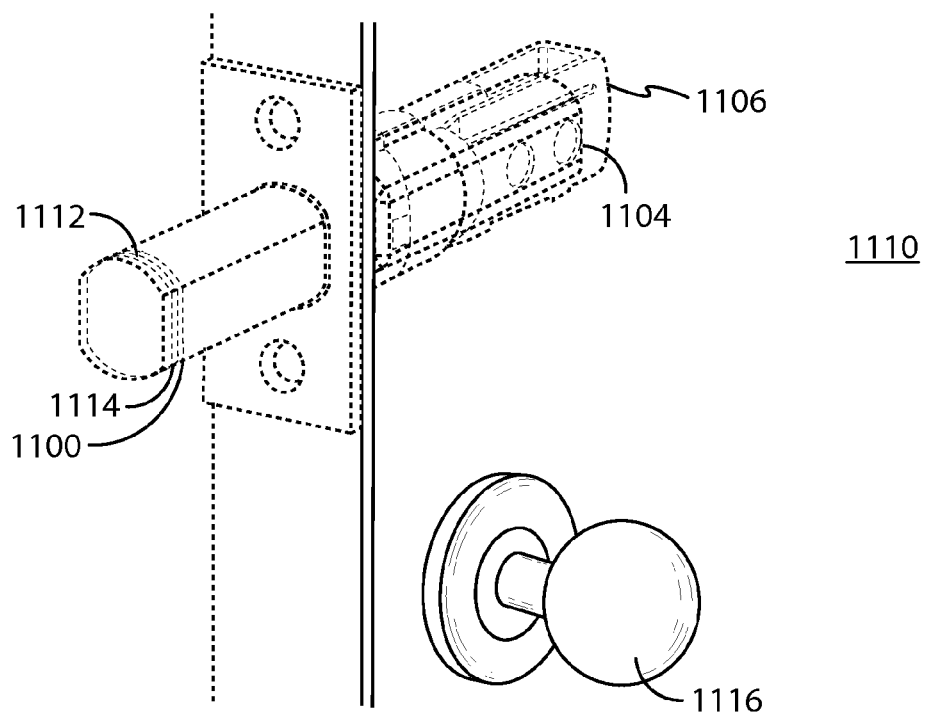
FIG. 11d is a close-up, perspective view of the door, frame, and security device of FIG. 10a, the door shown in a closed and unlocked state.

When door 1110 is closed and in an unlocked state (i.e., deadbolt 1104 is in an unlocked position, retracted inside door 1110), magnet 1102 is brought much closer to sensor 1100, as shown in FIG. 11d. When the door and deadbolt are in this position, sensor 1100 is able to sense an increase in the magnetic field from the low or no magnetic field sensed when door 1110 is in the open position. Sensor 1100 provides a signal to processor 1112 indicative of this magnetic field strength, and processor 1112 determines that the door is closed, but not locked, based on the information from sensor 1100. Processor 1112 typically compares the magnetic field information provided by sensor 1100 with information stored within memory 702 to make this determination.

Figure 11E:
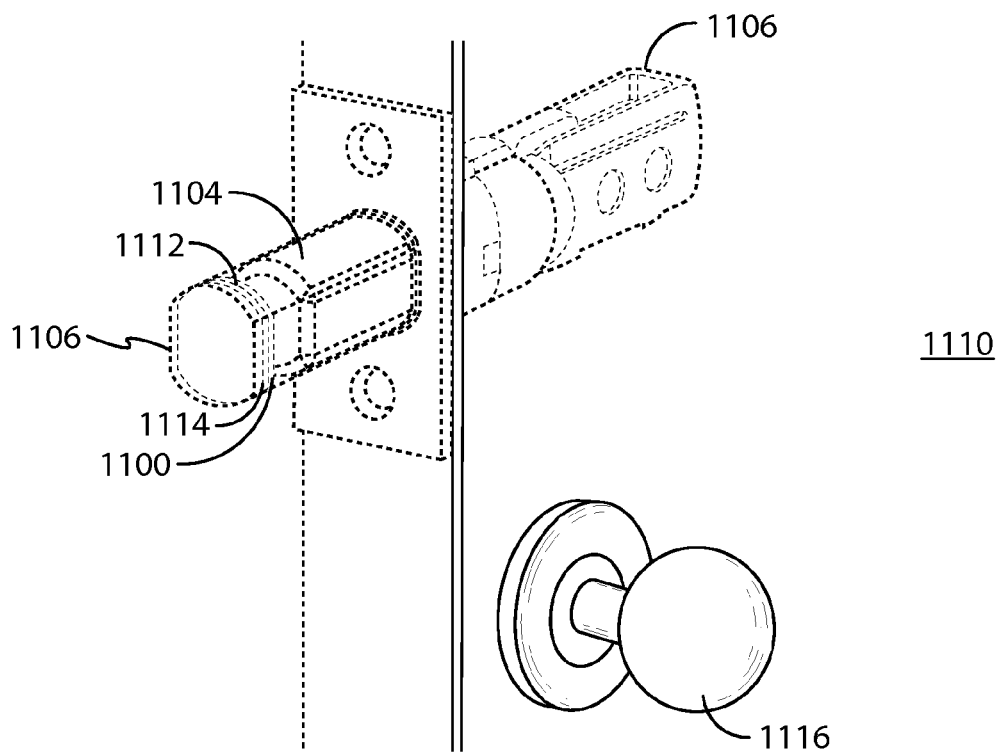
FIG. 11e is a close-up, perspective view of the door, frame, and security device of FIG. 10a, the door shown in a closed and locked state.

When door 1110 is closed and in a locked state (i.e., deadbolt 1104 is in a locked position, extended into recess 1106), magnet 1102 is brought in close proximity to sensor 1100, as shown in FIG. 11e. In this state, i.e., door closed and locked, the magnetic field sensed by sensor 1100 is greater than the strength sensed when door 1110 was closed and unlocked, due to magnet 1102 being in even closer proximity to sensor 1100. Sensor 1100 provides a signal to processor 1112 indicative of the magnetic field strength, and processor 1112 determines that the door is in a closed and locked position based on the signal from sensor 1100.

In any case, the status of door 1110 may be transmitted to a remote location via transmitter 1114, using techniques generally known in the art. The status may be transmitted upon a change in status, at regular or irregular time intervals, and/or upon the occurrence of a predetermined event. An optional receiver may be used as well, to receive information and/or commands/requests from a remote location, for example, to instruct processor 1112 to provide the latest door status to the remote location.

In a related embodiment, the placement of magnet 1102 and combination of sensor 1100, processor 1112 and transmitter 114 (and optional receiver) may be swapped. That is, in this embodiment, sensor 1100 may be located within deadbolt 1104 and electronically coupled to processor 1112 and transmitter 114 residing nearby within door 1110, a deadbolt assembly, or doorknob assembly, while magnet 1102 may be located within recess 1106. Detection of the door status would operate similarly to what was described above.

Figure 12A:
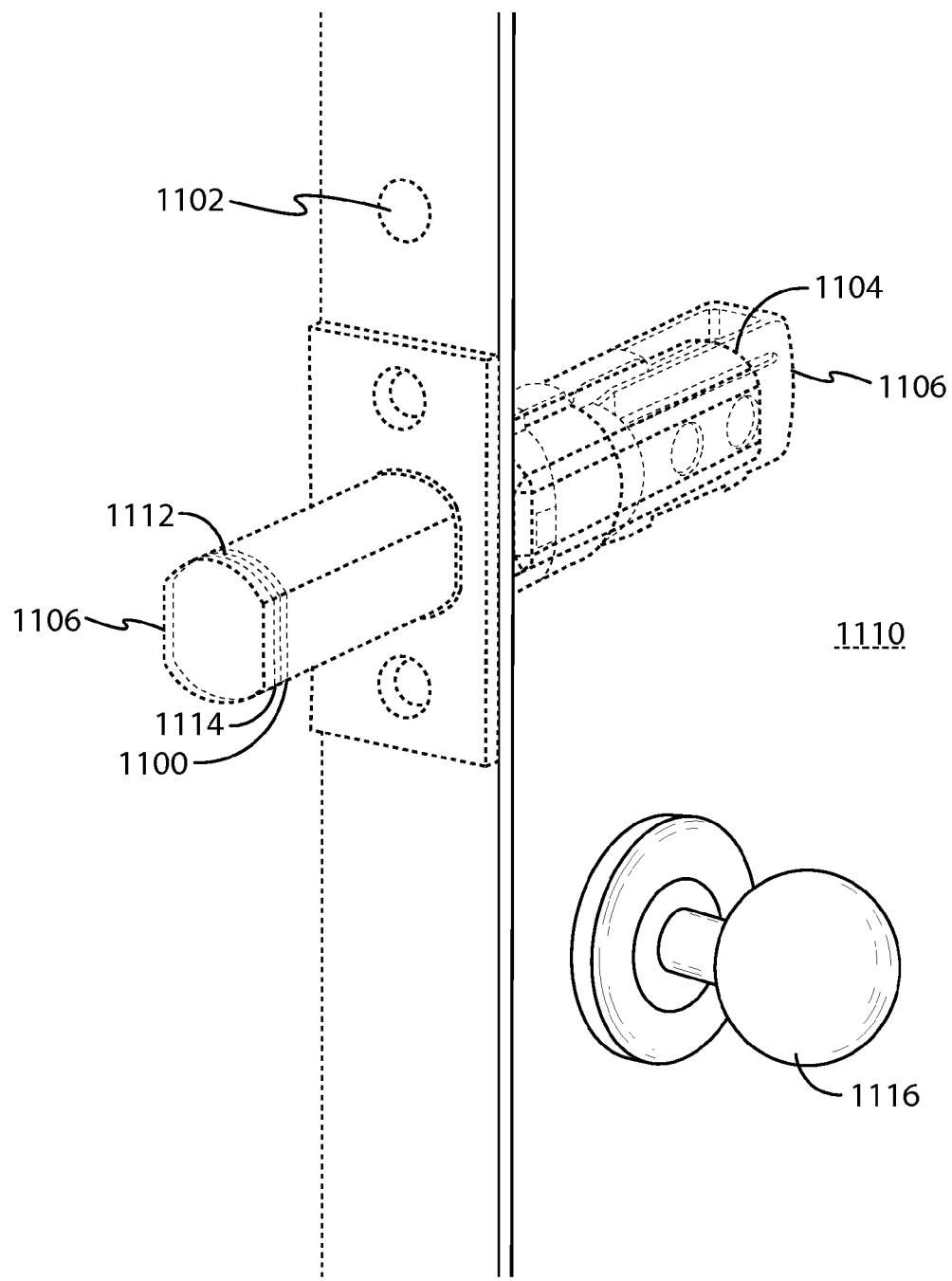
FIG. 12a is a close-up, perspective view of a door and door frame utilizing another embodiment of a security apparatus that determines the open/closed status and locked/unlocked status of the door, showing the door in a closed and unlocked state.

FIG. 12a is an illustration of a close-up, perspective view of yet another embodiment of a door, door frame, and security apparatus used to determine the open/closed status of the door and a locked/unlocked status of the door locking mechanism. FIG. 12a depicts the door 1200 in a closed position, positioned against door frame 1208. Shown is sensor 1200, in this embodiment, comprising a magnetic field sensor, installed into a lower, rear section of recess 1106 in door frame 1108. Recess 1106 is sized and shaped to accommodate deadbolt 1204 when deadbolt 1204 is in an extended position, thereby securely locking door 1210. Sensor 1200 is installed into recess 1206, and detects magnetic fields produced by a magnet 1102 installed into, or onto, a portion of door 1210, as shown.

Figure 12B:
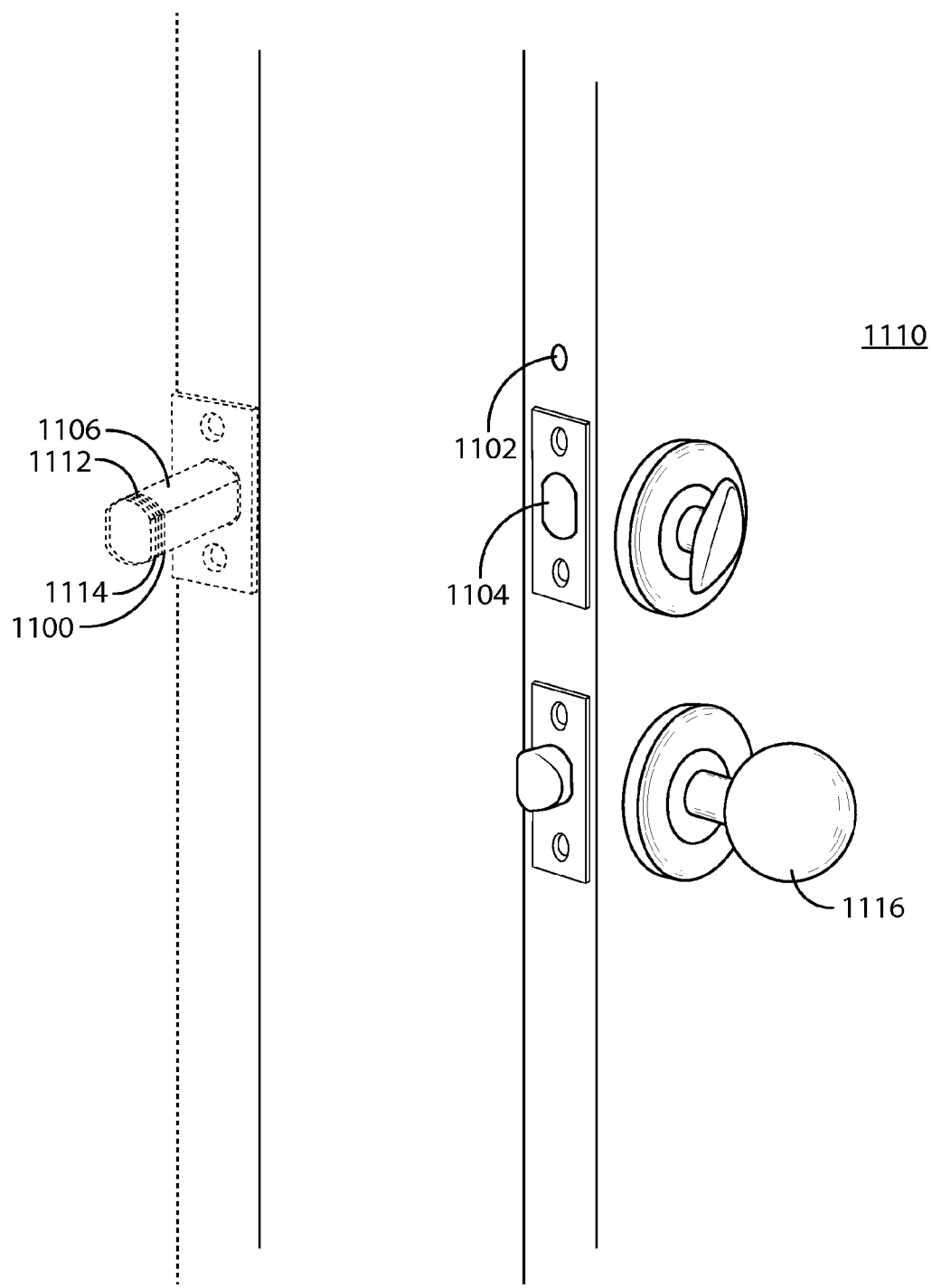
FIG. 12b is a close-up, perspective view of the door, frame, and security device of FIG. 12a, showing the door in an open state.

When door 1210 is in an open position, as shown in the close-up, perspective illustration of FIG. 12b, magnet 1202 is not in close proximity to sensor 1200. Thus, the magnetic field generated by magnet 1202 is either very weak or non-existent at the location where sensor 1200 is located, inside recess 1206. Sensor 1200 is coupled to processor 1212 and provides signals to processor 1212 indicative of a magnetic field sensed by sensor 1200, for instance, the strength of a magnetic field, an orientation of a magnetic field, a change in either the strength or orientation of a magnetic field, etc. Processor 1212 receives the signals from sensor 1200 and determines that the door is in an open position when the signal from sensor 1200 indicates that a low, or no, magnetic field is present.

When door 1210 is closed and in an unlocked state (i.e., deadbolt 1204 is in an unlocked position, retracted inside door 1110, see FIG. 12a), magnet 1202 is brought much closer to sensor 1200. When the door and deadbolt are in this position, sensor 1200 is able to sense an increase in the magnetic field from the low or no magnetic field sensed when door 1210 was in the open position. Sensor 1200 provides a signal to processor 1212 indicative of this magnetic field strength, and processor 1212 determines that the door is closed, but not locked, based on the magnetic field information provided by sensor 1200. In one embodiment, processor 1212 compares the magnetic field strength to a predetermined magnetic field strength stored in memory 1216 to determine the state of door 1210 (i.e., open/closed and locked/unlocked). In another embodiment, signals received from sensor 1200 are provided to transmitter 1214 and transmitted to a remote location, where they may be processed, e.g., compared to a predetermined magnetic field level.

Figure 12C:
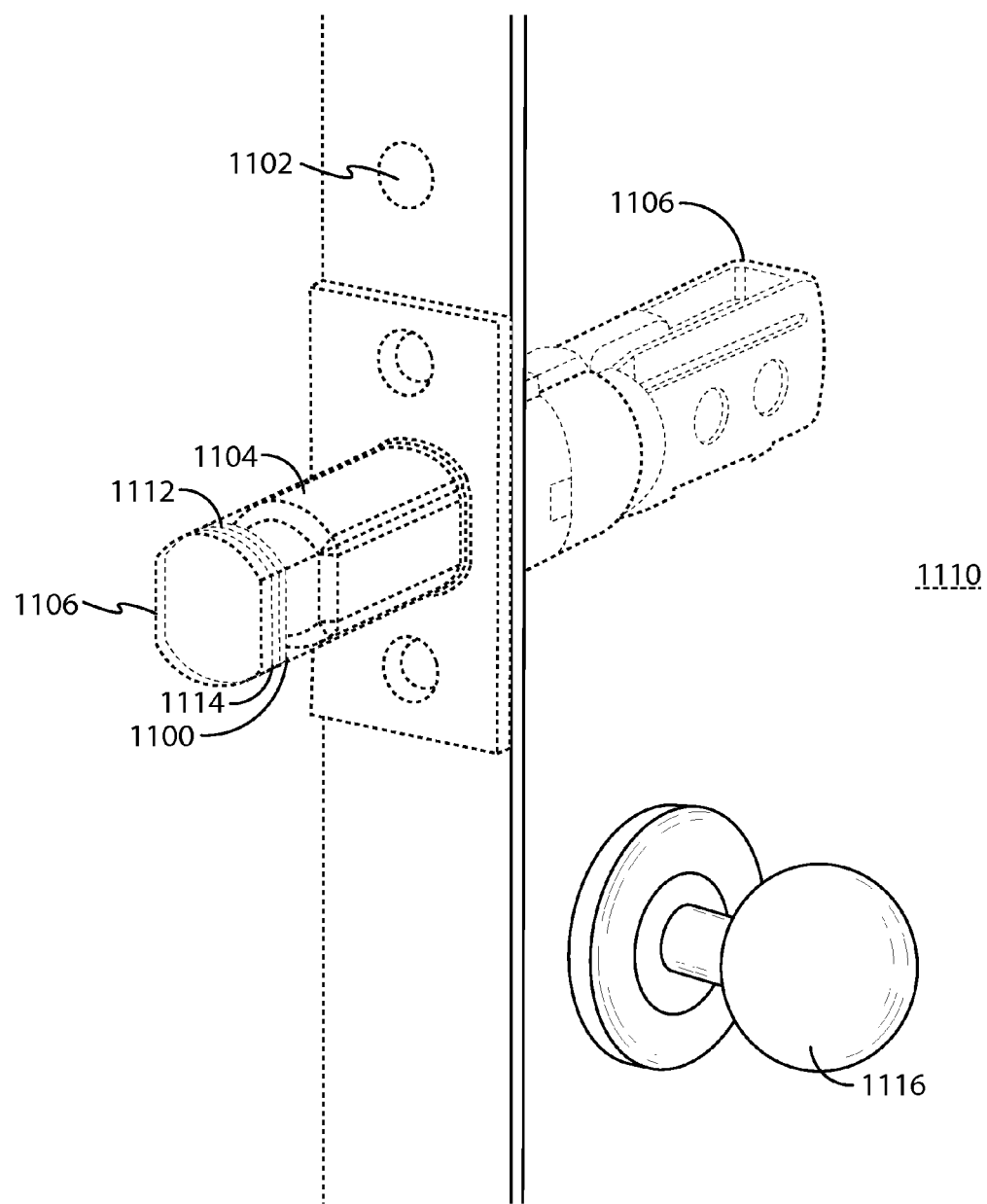
FIG. 12c is a close-up, perspective view of the door, frame, and security device of FIG. 12a, showing the door in a closed and locked.

When door 1210 is closed and in a locked state (i.e., deadbolt 1204 is in a locked position, extended into recess 1206), deadbolt 1204 is inserted into recess 1206, thus providing a physical barrier between magnet 1202 and sensor 1200, as shown in FIG. 12c. In this state, i.e., door 1210 closed and locked, the magnetic field sensed by sensor 1200 is different than the strength sensed when door 1210 was closed and unlocked, due to the presence of deadbolt 1204 interfering with the magnetic field sensed by sensor 1200. The magnetic field may be reduced or increased, depending on the material(s) and/or geometry of deadbolt 1204 and/or position of magnet 1202 and/or sensor 1200.

Sensor 1200 provides a signal to processor 1212 indicative of the magnetic field strength, and processor 1212 determines that the door is in a closed and locked position based on the signal from sensor 1200. In one embodiment, processor 1212 compares the magnetic field strength to a predetermined magnetic field strength stored in memory 1216 to determine the state of door 1210 (i.e., open/closed and locked/unlocked). In another embodiment, signals received from sensor 1200 are provided to transmitter 1214 and transmitted to a remote location, where they may be processed, e.g., compared to a predetermined magnetic field level stored in a memory. The door status may be transmitted upon a change in status, at regular or irregular time intervals, and/or upon the occurrence of a predetermined event.

It should be understood that many, if not all, of the embodiments discussed thus far could be used in a variety of other window and door types. Examples include casement windows (hinged at the side), sliding windows, sliding glass doors, awning windows (hinged at the top and open outward), or hopper windows (hinged at the bottom and open inward). In any of these window or door types, the techniques discussed above could be readily incorporated by those skilled in the art.

Figure 13:
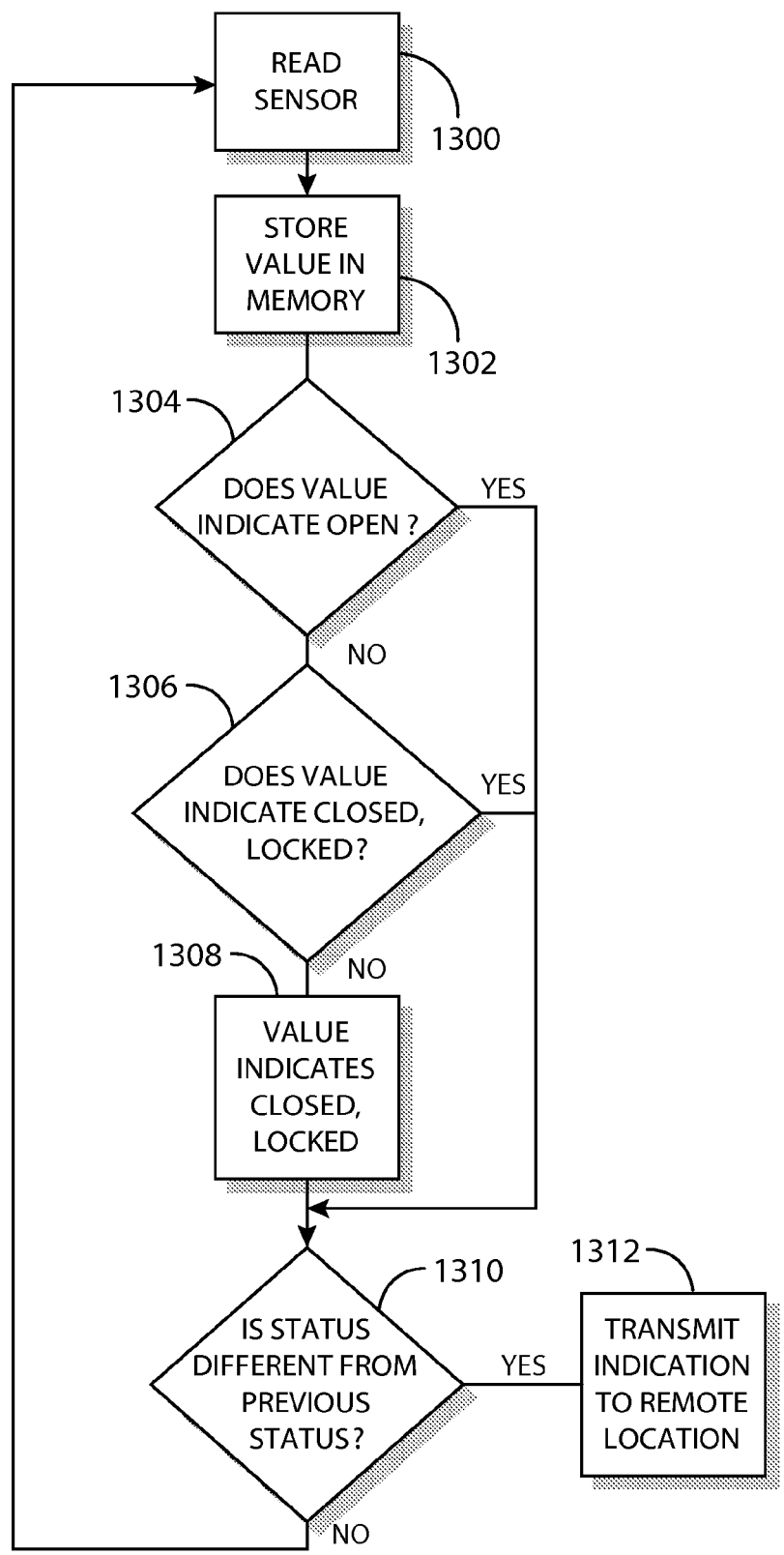
FIG. 13 is a flow diagram illustrating one embodiment of a method for determining a door or window status, including open/close and locked/unlocked states.

FIG. 13 is a flow diagram illustrating one embodiment for determining a status of a door or window. The method is implemented by a processor, such as processor 700 shown in FIG. 7 executing processor-readable instructions stored in a memory, such as memory 702 shown in FIG. 7. It should be understood that in some embodiments, not all of the steps shown in FIG. 13 are performed and that the order in which the steps are carried out may be different in other embodiments. It should be further understood that some minor method steps have been omitted for purposes of clarity.

At block 1300, a sensor that monitors a door or a window is read by processor 700 to determine a characteristic, property, or attribute being monitored by the sensor to determine the open/closed status and locked/unlocked status of the door or window. Processor 700 may read the sensor at predetermined time intervals, or upon a request from a remote location to provide a status, or upon the occurrence of some other event. In one embodiment, the sensor comprises a magnetic field sensor that determines a magnetic field produced by one or more magnets located on or within structural elements of a door or window. The magnetic field is used be processor 700 to determine whether the door or window is in an open or closed state, and whether the door or window is in a locked or unlocked condition. Other sensor types may be used in other embodiments, as explained above.

At block 1302, processor 700 may store a value in memory related to the reading taken at block 1300. The value may comprise a "raw" value of the characteristic, property, or attribute sensed by the sensor.

At block 1304, processor 700 uses the information provided by the sensor at block 1300 to determine if the door or window is in an open position. For example, the sensor may provide a resistance value, a capacitance value, a position of a mechanical object, an inductance value, a magnetic field strength, a magnetic field orientation, an electrical field strength, an electrical field orientation, etc. Processor 700 may determine the open/closed status by comparing the value(s) provided by the sensor to one or more values stored in memory 702. If the information provided by the sensor indicates that the door or window is open, processing continues to block 1310. If the information provided by the sensor indicates that the door or window is closed, processing continues to block 1306.

At block 1306, processor 700 uses the information provided by the sensor at block 1300 to determine if the door or window is in a closed and unlocked state. Processor 700 may determine this status by comparing the value(s) provided by the sensor to one or more values stored in memory 702. For example, the sensor may indicate, at block 1300, that a magnet located on a window sash is in close proximity to the sensor, while another magnet related to a locking mechanism on the door or window is not in close proximity to the sensor. If the information provided by the sensor indicates that the door or window is closed, and that the door or window is in an unlocked state, processing continues to block 1310. If not, processing continues to block 1306.

In one embodiment, at block 1308, processor 700 determines that the door or window is in a closed and locked state, based on the negative responses at blocks 1304 and 1306. In other words, if the door or window is not open, and not in a closed and unlocked state, than processor 700 determines that the door or window is in a closed and locked state by default; there being only four possible state combinations (open and locked, open and unlocked, closed and locked, and closed and unlocked) that are detectable by processor 700. In another embodiment, processor 700 uses the information provided by the sensor at block 1300 to determine if the door or window is in a closed and unlocked state, for example, by comparing the value(s) provided by the sensor to one or more values stored in memory 702.

At block 1310, processor 700 stores the determined window or door state in memory 702.

At block 1312, in one embodiment, processor 700 determines if the current status of the door or window is different than a previously-determined status, as stored in memory 702. If so, it is an indication that the door or window has been placed into a new physical state, such as from a state of "open" to a state of "closed and locked". If the current status of the door or window is different than a previous state, processing continues to block 1314, where processor 700 causes the current state of the door or window to be transmitted via transmitter 704 to a remote location, such as a central security status panel inside a home or business, or to a remote security monitoring center that is well-known in the art. In another embodiment, the "raw" information provided by the sensor at block 1300 is transmitted to the remote location in addition to the current door or window status. In yet another embodiment, only the "raw" information is transmitted.

If the current state of the door or window matches the previous state stored in memory 702, processing continues back to block 1300, where the next reading of the sensor occurs, in accordance with a selected sensor-reading scheme (e.g., time-based, event-based, etc.).

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A security apparatus for determining at least two conditions related to a door or a window, comprising:
   a single reed switch for detecting a first magnetic field that varies as a first door or window condition is achieved and as a second door or window condition is achieved, and for generating signals indicative of the first magnetic field; and
   a processor coupled to the single reed switch for determining the first door or window condition and the second door or window condition based on the first magnetic field;
   wherein the first door or window condition comprises an open or closed position and the second door or window condition comprises a locked or unlocked status.

2. The security apparatus of claim 1, further comprising:
   a first magnet for producing the first magnetic field.

3. The security apparatus of claim 2, further comprising:
   a lock assembly;
   a first magnet located on or within the lock assembly for generating the first magnetic field;
   wherein the magnetic field strength generated by the first magnet is sensed by the single reed switch to determine whether the door or window is in a locked state or an unlocked state.

4. The security apparatus of claim 3, further comprising:
   a second magnet located on fixed portion of the door or window for producing a second magnetic field;
   wherein the magnetic field strength generated by the second magnet is sensed by the single reed switch to determine whether the door or window is in an open state or a closed state.

5. A method for determining a door or window state, comprising:
   detecting, by a single reed switch, a first magnetic field that varies as the door or window is opened or closed and as the door or window is placed in a locked or unlocked state;
   comparing the first magnetic field to information stored in a memory indicative of at least one door or window state;
   determining, by a processor coupled to the memory and the single reed switch, the at least one door or window state based on the comparison of the first magnetic field to the information in the memory; and
   transmitting the door or window state to a remote entity.

6. The method of claim 5, wherein the at least one door or window state comprises the door or window being in a closed and unlocked condition.

7. A status monitoring device for a window or door, the window or door including at least one portion movable between an open position and a closed position and the window or door including at least one locking mechanism movable between a locked position and an unlocked position, the device comprising:
   a single reed switch for generating a signal indicative of a measured magnetic field that varies as the first portion is moved between the open position and the closed position and as the locking mechanism is moved between the locked position and the unlocked position;
   a memory for storing predetermined information relating the measured magnetic field to one of a multiple of door or window statuses; and
   a processor coupled to the single reed switch and to the memory, for receiving the signal from the single reed switch and comparing information in the signal to the information stored in the memory, and for determining at least two conditions associated with the door or window based on the comparison;
   wherein the first condition comprises an open or closed position and the second condition comprises a locked or unlocked status.

8. The status monitoring device of claim 7, further comprising:
   a first magnet located on or within the locking mechanism for producing the magnetic field;
   a second magnet located on the movable portion for producing a second magnetic field;
   wherein the single reed switch determines a resultant magnetic field from the magnetic field and the second magnetic field, and the processor determines the status of the door or window by comparing the resultant magnetic field to information stored in the memory.

9. The status monitoring device of claim 7, further comprising:
   a magnet for producing the magnetic field;
   wherein the processor determines that the door or window is in a closed and locked status when the magnetic field is altered as the locking mechanism is placed into a locked position.

\* \* \* \* \*